United States Patent [19]
Walters et al.

[11] Patent Number: 5,646,623
[45] Date of Patent: Jul. 8, 1997

[54] COHERENT, FREQUENCY MULTIPLEXED RADAR

[76] Inventors: Glenn A. Walters, 917 Seph Way, Escondido, Calif. 92606; Lance M. Teschmacher, 12935 Long Boat Way, Del Mar, Calif. 92014

[21] Appl. No.: 324,677

[22] Filed: Nov. 24, 1981

Related U.S. Application Data

[63] Continuation-in-part of Ser. No. 155,592, Jun. 2, 1980, abandoned, which is a continuation-in-part of Ser. No. 906,049, May 15, 1978, abandoned.

[51] Int. Cl.$^6$ .................................................. G01S 13/536
[52] U.S. Cl. ............................ 342/129; 342/112; 342/200
[58] Field of Search .................. 343/5 NQ, 17.2 PC, 343/5 HM, 5 BB, 9 R, 14, 17.5; 342/112, 129, 200

[56] References Cited

U.S. PATENT DOCUMENTS

| | | | |
|---|---|---|---|
| 3,101,469 | 8/1963 | Varian | 343/9 |
| 3,212,053 | 10/1965 | Finney | 343/14 |
| 3,344,426 | 9/1967 | Long | 343/17.2 PC |
| 3,750,171 | 7/1973 | Faris | 343/9 |
| 3,878,525 | 4/1975 | Alpers | 343/17.5 X |
| 4,005,417 | 1/1977 | Collins | 343/17.2 PC |
| 4,307,399 | 12/1981 | Love et al. | 343/17.2 PC X |

*Primary Examiner*—Gilberto Barrón, Jr.

[57] ABSTRACT

Coherent, frequency multiplexed radar is a new generic type of continuous wave radar architecture wherein contiguous pulses of discrete frequency segmented signals are serially transmitted from an antenna, and after reflection from radar targets, signals from the same antenna are coherently processed in a parallel manner to provide correlated measurements of target's pulse compressed range and radial velocity. Simultaneously transmitted and received signals are separated by frequency multiplexing.

9 Claims, 7 Drawing Sheets

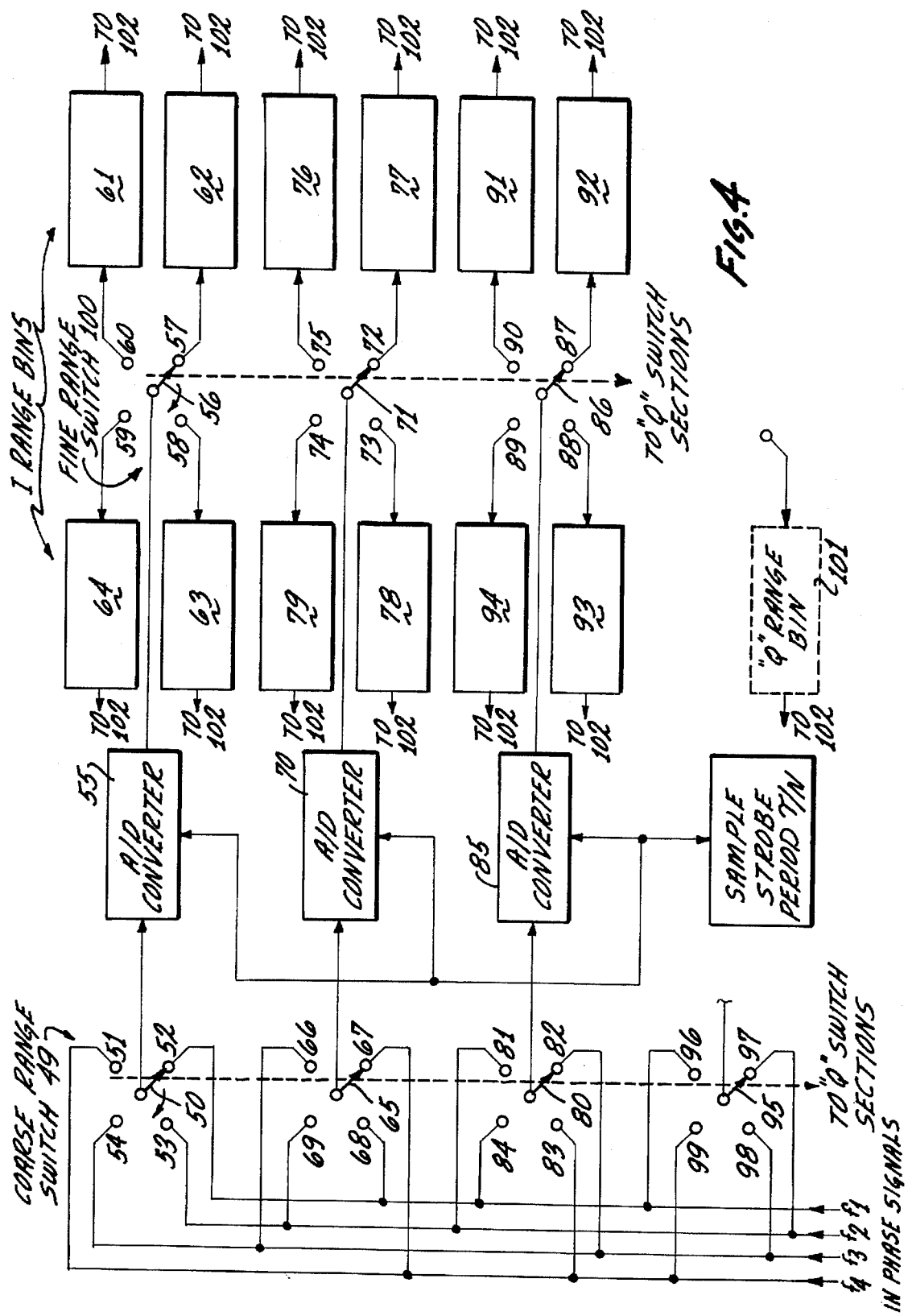

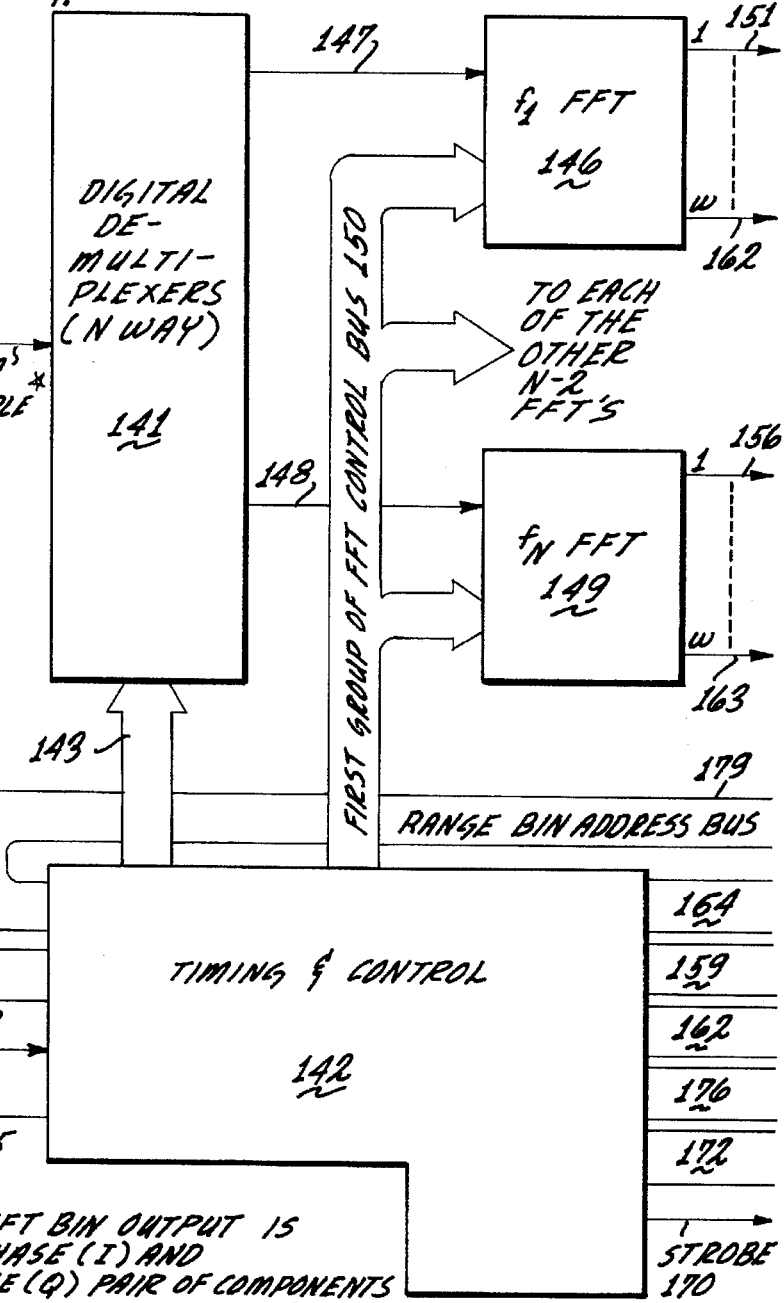

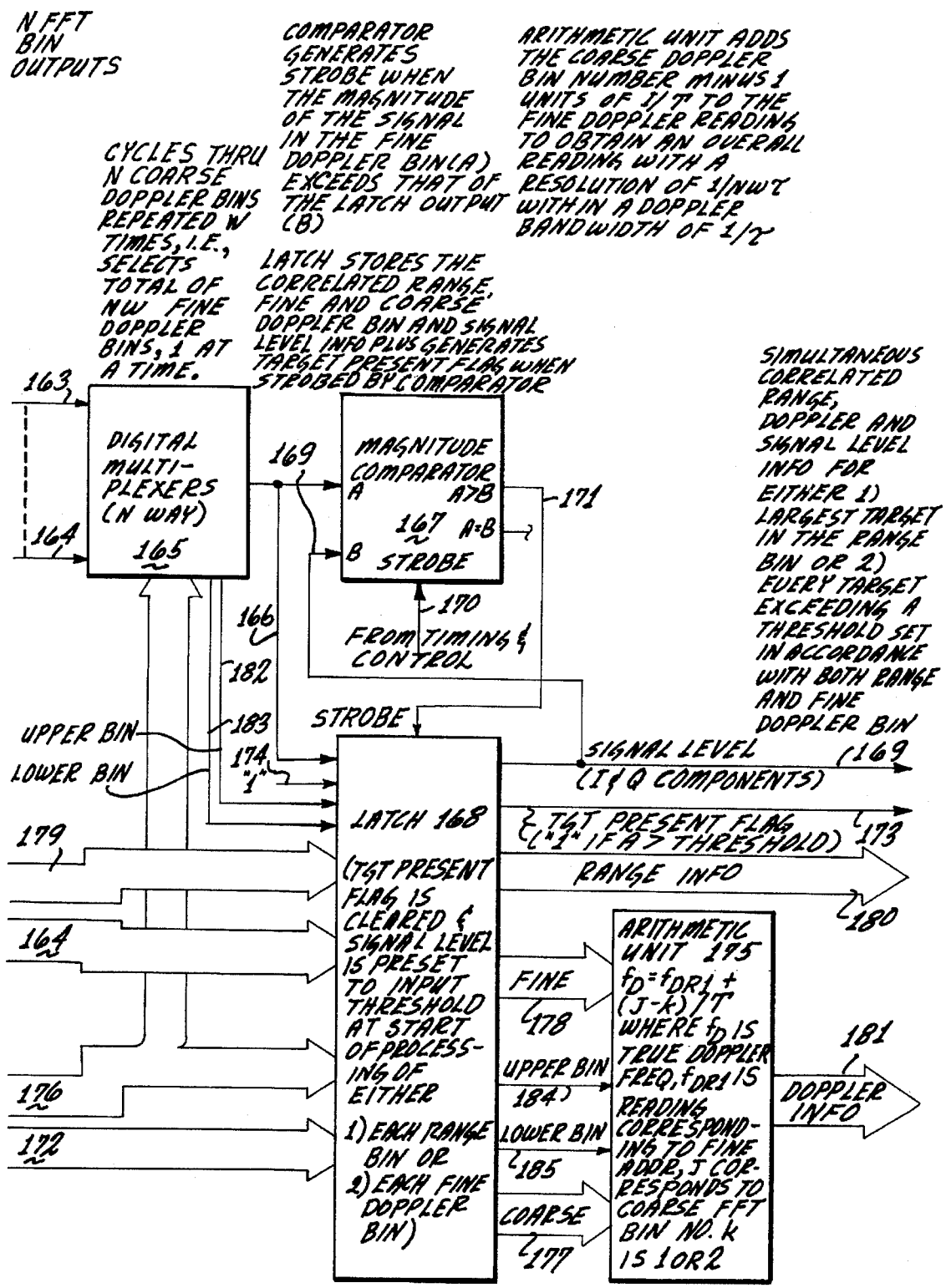

COHERENT, FREQUENCY MULTIPLEXED RADAR

This is a continuation-in-part of application Ser. No. 06/155,592 filed Jun. 2, 1980 abandoned which in turn is a continuation-in-part of application Ser. No. 05/906,049 filed May 15, 1978 abandoned.

BACKGROUND OF THE INVENTION

Radar, since its rapid development during World War II, has become a primary sensor for both military and nonmilitary operations. Continuing developments have greatly improved the operational capabilities of radar systems; however, parallel increases in operational requirements have increased technological deficiencies. A relatively large and specialized vocabulary has evolved that relates to radar problems and operational requirements: e.g., clutter, electronic counter measures (ECM), jamming, chaff, decoys, anti-radiation missiles (ARM), low probability of intercept (LPI), identification of friend or foe (IFF), electromagnetic interference or control (EMI/EMC), high density targets, etc. The solutions to all the above problems relate to improving resolution in the space, time and frequency domains, and increasing the RF to information bandwidth ratio. The problems and solutions are interrelated and are often at cross purposes; e.g., increased resolution often adversely affects data rates. The development of conventional radar has been directed towards higher average power, pulse repetition rates, duty cycles, pulse compression ratios and improved Doppler frequency resolution. Unfortunately, processing losses associated with signal eclipsing and functional time sharing along with system complexity have also increased. A new generic type of radar design architecture is required. CFMR (coherent frequency multiplexed radar) offers solutions to many of these categorical problems.

Radar operates in the time, space and frequency domains. Transmitter and receiver signal isolation can be achieved in any of these domains. In pulse radar the transmitting and receiving periods are separated in the time domain. Signal separation in CW radar systems, except for some special purpose low power application, is achieved in the space domain (separate antennas). In CFMR the transmitted wave is continuous, but is comprised of a series of contiguous pulses transmitted at different frequencies in such a manner that they can be separated, from each other and from the signal being transmitted, by frequency multiplex techniques. Furthermore, a coherent relationship between the voltage vector of each frequency segment transmitted provides for simultaneous measurement of target range and velocity with optimum processing gain maintained.

CFMR is a continuous wave system and must therefore be able to receive while transmit. It can, in part, utilize the same implementation as conventional continuous wave radar; primarily, separate transmitting and receiving antennas, duplexors (circulators with canceller and Doppler frequency shift. CFMR, by virtue of its coherent frequency segmented signal format, has the further advantage of separating the signals through frequency multiplexing techniques. Foregoing the option of dual antennas for transmit and receive functions, the duplexor in CFMR operation reduces the coupling between the transmitter's output and the receiver's input (radio frequency preamplifier and/or first mixer) such that the residual transmitted power, as observed at the input of the receiver, is insufficient to cause burnout, excessive overloading to introduce undesirable non-linearities or degrade the receiver's noise figure. In CFMR the frequency separation of individual segments making up the signal format is accomplished at IF and/or baseband frequencies through frequency multiplexing by means of analog filters and/or digital filtering techniques utilizing appropriate time sampling in the radio frequency detection process. Doppler extraction is accomplished in much the same manner as with conventional Doppler radar, i.e., further dividing coherent baseband frequencies into Doppler frequency bands. Signal processing is conveniently implemented through digital computer techniques.

A comparison of the pertinent operational features of the radar technologies are tabulated below:

| Radar Type | Resolution Range (Time) | Resolution Velocity (Doppler Freq) | Ambiguities Range (Time) | Ambiguities Velocity (Doppler Freq) | Processing Gain |
|---|---|---|---|---|---|
| Pulse or Pulse Doppler | $\frac{c\tau}{2}, \alpha\tau$ | $\frac{c}{2f_cT_i}, \alpha\frac{1}{T_i}$ | $\frac{c}{2PRF}, \alpha\frac{1}{PRF}$ | $\frac{cPRF}{2f_c} \ \alpha PRF$ | $\alpha \sqrt{T_i}$ |
| Pulse Compression | $\frac{c\tau_e}{2}, \alpha\tau_e$ | — | $\frac{c}{2PRF}, \alpha\frac{1}{PRF}$ | — | $\alpha \sqrt{T_i}$ |
| Doppler | ↑ | $\frac{c}{2f_cT_i}, \alpha\frac{1}{T_i}$ | — | none | $\alpha T_i$ |
|  | — ① | ↑ |  |  |  |
|  | ↓ | ② ↓ |  |  |  |
| CFMR | $\frac{c\tau_e}{2}, \alpha\tau_e$ | $\frac{c}{2f_cT_i}, \alpha\frac{1}{T_i}$ | $\frac{cT_i}{2}, \alpha T_i$ | $\frac{c}{2f_c\tau} \ \alpha\frac{1}{\tau}$ | $\alpha T_i$ | where
c = speed of light
$f_c$ = carrier frequency
PRF = Pulse Reception frequency
$\alpha$ = PROPORTIONAL TO
$T_i$ = integration period
$\tau$ = pulse or frequency segment width
$\tau_e$ = 1/total bandwidth of transmitted signal Note brackets 1 and 2. CFMR has the range resolution of pulse compressed radar and the Doppler resolution of CW radar. Its range ambiguity, for extended pseudo-random codes, is greater than pulse by the ratio $T_i$·PRF. Its Doppler frequency ambiguity is $1/\tau$, which in practical FFT filter processors is the same for conventional CW Doppler radars. Coherent processing is used for both CFMR and Doppler radars and the resulting gain is proportional to $T_i$.

The range bin array of coherent signal time elements can be processed to improve range measurement accuracy and resolution. The time bandwidth characteristics of the transmitted wave are efficiently processed. For example, the total accumulated bandwidth can be utilized in deriving high range resolution. Thus, CFMR affords the same resolution capabilities as conventional pulse compressed radar. The period of the range frequency sequence is usually greater than the transit period to the most distant target of interest; but can be of any desired length consistent with scenario geometry and dynamics. This characteristic eliminates range ambiguities associated with high PRF pulse radars. Continuous operation provides a 100% duty cycle that minimizes peak power to an average value. It is the average value of power that determines radar performance. Non-ambiguous measurements of each target's range and velocity are simultaneously derived from the same waveform. These factors extend the capability of synthetic aperture applications in terms of operating range and ability to efficiently detect moving targets. This can eliminate the need for large aperture scanning antennas in radar systems operating from moving platforms. Furthermore, in fixed installations advantages can be accrued by utilizing small size, wide angle, transmitting antennas in combination with large aperture, multi-beam receiving arrays wherein parallel processing over the total period normally allotted to scanning a frame provides system gain in excess of the system loss introduced by the wider angular coverage of the transmitting antenna. Through parallel processing the data rate is no longer constrained by scanning requirements, but relates only to scenario dynamics. A large number of circuit elements are required to instrument parallel processes. In CFMR the circuits are identical and repetitive. Available signal processing resources can be used for wide area, coarse resolution surveillance; sector or restricted area, medium resolution search or zooming operations for high resolution target classification.

Conventional radar technology relative to such functions as sensitivity time control and moving target indications can be implemented. Advantages of frequency agility, spread spectrum and frequency related functions are inherent to the process. The instantaneous bandwidth of each frequency segment is less than that associated with conventional pulse radars. Peak powers are reduced to average values and processing losses associated with high duty cycle, staggered PRF radars are eliminated, thereby minimizing average power requirements. The segmented signal format allows maximum use of digital computer technology in terms of time, frequency, power management, adaptive control and signal processing. These factors are of prime importance when considering requirements for covert operation, jamming resistance and other problems that relate to maintaining operational capabilities in hostile environments. Improved resolution in the time, frequency and space domains is the solution to problems related to clutter, target classification, etc.

SUMMARY OF THE INVENTION

The present invention is a new and unique radar system utilizing a specific signal format best controlled and processed by special purpose digital computers and related technology.

The signal format consists of a continuous wave transmission, and subsequent reception, of a series of discrete frequency segments. The specific signal format employed can be chosen to provide a number of functional capabilities. To eliminate range ambiguities, the code period of the basic signal format is equal to or greater than the time out to the most distant target of interest. The frequency steps, within the code period, are sufficiently large to prevent self-jamming and allow simultaneous transmit and receive operation from a common antenna through frequency multiplexing techniques. All frequencies transmitted have a coherent relationship with the baseband frequency and are generally harmonically related. The coherent relationship provides maximum signal processing gain and permits the signal to be pulse compressed. The continuous wave aspect eliminates PRF velocity ambiguities and establishes a phase-time schedule of the transmitted wave form that provides the means for determining target radial velocity.

Implementing the transmitted signal requires that coherency be maintained. This is accomplished by establishing a reference or clock frequency that all other frequencies are coherently related to. From this reference frequency, a group of harmonically related baseband frequencies in the video frequency range, can be coherently derived and then added through mixing with a desired microwave frequency for serial transmission. Upon reception, the reflected signals are coherently mixed back down to their original baseband frequencies, where they are time sampled and processed in a parallel manner.

Separation of transmitted and received signals from a common antenna is first accomplished by a circulator. Additional isolation is provided by cancellation circuitry. This isolation prevents the residual transmitter signal from damaging, overloading, or deteriorating the receiver radio frequency pre-amplifier and/or first mixer circuits. Separation of the signals to individual baseband frequencies is accomplished within the intermediate frequency amplifiers and signal detection circuits after the first mixer.

Frequency demultiplexing requires a frequency separation between received channels. The greater the frequency separation between adjacent channels, the less stringent the filtering requirements. CFMR operation depends upon the transmission of contiguous frequencies during the range code word to minimize range and velocity ambiguities. There are a number of design techniques available to increase the frequency separation between adjacent time segments while fulfilling the requirements of CFMR operation. This involves frequency filtering by either analog or equivalent digital sampling technique in the time domain.

It is generally desirable to weigh the amplitude of the frequency segments to minimize the time sidelobes in the compressed pulse pattern. Weighing, without loss in power transfer, can be accomplished by judiciously omitting the transmission of selected pulsed frequency segments. Under such conditions all pulsed frequency segments are transmitted in the central spectral area of the signal's frequency band while the pulsed frequency segments nearer the edge of the band are increasingly separated by the removal of chosen frequency segments. Utilization of nonuniform frequency segmented codes can be judiciously integrated with other techniques, such as increasing the frequency separation between pulses and conserving processing resources.

In CFMR it is not necessary to transmit the frequency segments making up the total bandwidth required in any particular order. Several design considerations lead to the conclusion that it is not desirable to operate in a linearly stepped frequency sequence. First, the peak sidelobe levels of the ambiguity function and range/velocity cross-coupling can be minimized for highly non linear sequences. Second, the code can be made optimum to reduce effects of harmonic inter-modulation products resulting from the mixers. Third, an optimum code, or order, can be chosen such that a maximum frequency separation is achieved between transmitted and received signals from targets at any desired range, most importantly maximum range. It is these lower level signals that determine the maximum isolation requirements. Signals returning from shorter ranges have greater signal strengths and require less isolation. Basically, any range at which sensitivity time control attenuation is used does not require as much isolation between received signals and the transmitter's leakage power level. The purpose of the frequency demultiplexer is to retain a required return signal to transmitter leakage power ratio, generally, greater than 20 dB.

Baseband frequency components are coherently combined with other frequencies prior to their final conversion to the transmitter carrier frequencies for spread spectrum operation. This design approach may be used advantageously in a CFMR operation where pre-conversion demultiplexing is used.

The combined choices of the frequency segmented code period and the bandwidth requirements to provide pulse compressed range resolution combine to establish the number of frequency segments transmitted during a given frequency segmented code period. The instantaneous bandwidth of the transmitted frequency segment is less than the total bandwidth required to obtain a given range resolution. This reduction in instantaneous bandwidth coupled with the ability to utilize arbitrary frequency sequences is of importance when the desired objective is to operate in a jamming environment or in a covert manner. The frequency segmented code is normally made longer than the transit period to the most distant target of interest: to increase range resolution without increasing the instantaneous bandwidth, to provide additional jam resistance or covert operational margins; extend the operational range of synthetic aperture radar capabilities and reduce the level of "second time around" targets.

Pulse compression is accomplished by processing the target reflected frequency segments into parallel time coherency such that the voltage maximas of each frequency segment can be vectorially added. The pulse compressed processing gain is proportional to the number of frequency components so summed. The range resolution of the compressed pulse is inversely proportional to the total bandwidth of the processed baseband frequency segmented code.

The correlation process requires that separate storage bins be provided for each target range and velocity of interest. In tracking systems, when the target is "range tracked", only a few range bins need be implemented. In extended range, large angular coverage surveillance systems, a large number of identical range bins are required. In such cases the number can be constrained by directing available processing resources to restricted areas. Furthermore, a given number of range bins can cover large areas with relatively coarse resolution and smaller areas with finer resolution. When used in synthetic aperture applications, a zooming technique can be implemented wherein available processing resources can be used to classify designated targets of interest. The sequential contiguous range bins form an array of coherently related time elements that can be advantageously processed to improve operational characteristics. For example, adjacent elements can be processed together to improve measurement accuracy.

There are several techniques available for obtaining Doppler information from CFMR; however, a new and novel technique, to be described, provides correlated range-velocity information from individual targets in a direct manner.

CFMR signal processing can be accomplished utilizing digital techniques wherein received signals are converted to baseband frequencies, quadrature detected relative to the baseband reference frequency into "I" and "Q" (in phase and quadrature phase) channels, sampled at a rate related to resolution requirements, converted from analog to digital signals, and through appropriate switching correlated into sequential "I" and "Q" storage range bins. The outputs of the "I" and "Q" range bins sampled at a given range can be phase rotated sequentially to account for Doppler shift and are then vectorially added to optimize the signal to noise ratio of a signal detected at the corresponding range. The "I" and "Q" outputs corresponding to each input sample are used to compute the phase angles of the signal vector with respect to the "I" and "Q" axes. For fixed targets the angle of the vector remains constant. For moving targets this vector rotates at a rate corresponding to the Doppler frequency introduced by target's radial velocity. This is detected by processing the "I" and "Q" signals through a Fast Fourier Transform (FFT) signal processor or other phase rotational arrays. This process is coherent and retains full coherent processing gain.

The following considerations are pertinent:

1. Each frequency segment is a separate entity starting at the time of its initiation and ending a segment period later. Each is capable of a separate range reading.

2. In equal time periods, phase changes introduced by Doppler shift in harmonically related baseband frequencies, which are much lower than the carrier frequency, are very nearly the same. If required, a-priori information of the exact frequency of the transmitted signal defines phase rotation corrections required for aligning vectors coherently in like Doppler frequency bins.

3. The sampling period for received signals is clocked in accordance with the transmitted signal format.

4. When receiving signals from fixed targets the phase angle of the returned signal varies in a known and cyclic manner relative to target range.

5. Measured range to target is identical for both fixed and moving targets.

6. When receiving signals from moving targets the phase angle of the received signal, referenced to the "I" and "Q" axes is a function of both range and Doppler.

7. Therefore, a measurement of Doppler, and hence, the target's radial speed, can be derived from a measurement of the progressive change in the received signal's phase angle with respect to the "I" and "Q" axes.

To minimize the transmission of harmonics the CFMR waveform is generally continuous. Changes in the amplitude are minimized. As it relates to CFMR operation, Doppler shift is simply due to differences in the transit time to the target that occurs while the incident wave is being reflected from a moving target. For targets having closing radial velocities the received pulse is compressed in time. At the transmitted frequency the received wave is similar, in terms of continuity, to the transmitted wave. For moving targets, the converted baseband frequency, relative to the "I" and "Q" axes, through different angle of rotations than incurred from fixed target returns or experienced in a replication of the original transmitted pulsed frequency segment. This continuing phase rotation is a measurement of the difference in transit time incurred from reflections off a moving target and provides the means for measuring the radial velocity of the target. In harmonically related baseband frequencies of equal pulse periods the progressive phase shifts are very nearly the same, or can be phase corrected to be the same, for all frequency segments for all pulses and provide correlation gain. This change in phase angle can be measured in several ways. For the digital process previously described the phase angle is equal to the inverse tangent of the ratio of "I" and "Q" signals and the rate of phase change or Doppler frequency is conveniently measured via an FFT processor.

It is the total management and control of the detailed characteristics of the transmitted waveform in terms of time, frequency, phase, amplitude and continuity that when cross-correlated with target's returned signals provides the means for simultaneous extraction of detailed target information not hitherto available from conventional radars. The resolution characteristics of an extremely wide band pulse compressed radar can be duplicated and accuracy of measurement improved upon. A continuous wave, fixed frequency signal, can through appropriate signal processing, be derived and yield unambiguous velocity information. The time—bandwidth characteristics of the signals are efficiently utilized. Peak powers are reduced to average values, and average powers, when compared to high duty cycle, staggered PRF radar, are reduced by virtue of reduced eclipsing and time sharing losses.

The CFMR signal processing technique has direct application in the design of SONAR systems. Analogs exist between electromagnetic and sonic sensing systems. They operate in identical domains; time, frequency and space. Noise and many other operational factors can be similarly treated. The primary difference exists in environmental factors related to the mediums such as reverberation, multipath, ducting and other transitory variations in the transmission paths of the energy fields. In medium to long range SONARS the useful bandwidth can be extremely limited, e.g., less than 10 Hz. The CFMR signal process utilizes a relatively small instantaneous bandwidth in each signal channel to provide, over a period of time, a larger bandwidth for information detail. This design parameter, along with others that have equal application to both mediums, make the CFMR signal process extremely useful to SONAR system application.

The primary object of this invention is to provide a new and useful radar system wherein the transmitted signal format is a continuous wave consisting of time programmed, discrete frequency segments and the frequency separation and stability between selected frequency segments provides frequency multiplex operation to achieve a transmit-while-receive capability from a common antenna aperture.

A second object is to describe a means to extract nonambiguous measurement of each target's range and velocity simultaneously from the same waveform.

A third object is to show that the range bin array of coherent signal time elements is capable of providing increased measurement accuracy.

A fourth object is to describe instrumentation required to implement CFMR.

A fifth object is to describe the design technology involved in the digitally implemented signal process for extracting range and velocity information.

BRIEF DESCRIPTION OF THE DRAWINGS

Other objects and many advantages of this invention will become more apparent upon the reading of the following detailed description and examination of the drawings, wherein:

FIG. 4 illustrates signal commutation into range bins;

FIGS. 5A–5C (hereinafter referred to as FIG. 5), illustrate a range and Doppler processor functional block diagram.

FIG. 7 is a schematic demonstrating frequency multiplexing by digital techniques.

DESCRIPTION OF THE PREFERRED EMBODIMENT

Figure 1:
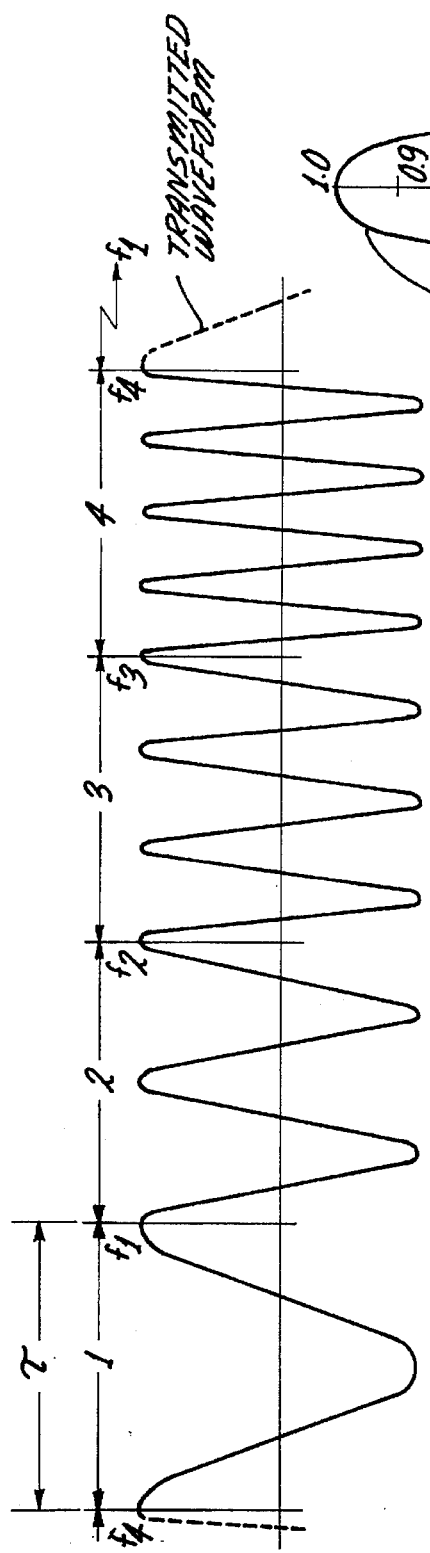
FIG. 1 illustrates a transmitted baseband waveform.

The baseband waveform, refer to FIG. 1, consists of a continuous waveform of a series of discrete, coherently related, frequencies having a predetermined segment width and transmitted in a contiguous manner. The frequency and pulsewidths are chosen in a pseudo-random manner; however, for the purposes of this discussion consider a number of linearly stepped, harmonically related, frequencies of equal pulsewidth wherein:

$$N = \sqrt{T \times \Sigma BW}$$

$$\tau = \frac{T}{N} = \frac{1}{BW_n}$$

$$\Delta R = \frac{c}{2\Sigma BW}$$

$$BW_n = \frac{\Sigma BW}{N}$$

$n^2$=Number of Range Bins $G_{pc}$=N $T_i$=WT

Where:

N=The number of frequency segments transmitted in a range code word.

T=The range code word period.

$\Sigma BW$=Total bandwidth of transmitted signal.

$\Delta R$=Range resolution $BW_n$=1 F noise bandwidth $G_{pc}$=Processing gain derived from pulse compression.

$\tau$=Pulsewidth of frequency segments

W=The number of rangewords integrated $T_i$=Total integration time c=Velocity of electromagnetic propogation.

To further simplify the discussion, consider four baseband modulation frequency segments, wherein $f_1$=100 kc, $f_2$=200 kc, $f_3$=300 kc, and $f_4$=400 kc, are transmitted during 10 µs pulse periods 1, 2, 3 and 4 to form a continuous wave signal, i.e., at the completion of period 4, $f_1$ is contiguously transmitted and so on. These baseband frequencies are to be coherently translated to a desired carrier frequency; example, a frequency band near 10 GHz. It is important to note that the baseband frequencies are important and the signal process is independent of carrier frequency. Parametric values for the chosen example are:

N=4

$G_{pc}$=4

$\Delta R$=375 meters ($\approx$0.2 miles)

$\Sigma BW$=400 Khz $BW_n = 100$ Khz
$T = 40$ μsec
$\tau = 10$ μsec

Figure 2:
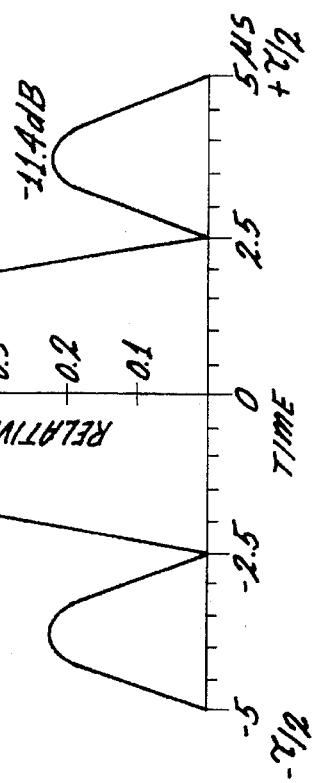
FIG. 2 illustrates a pulse compressed waveform.

Upon reception the returned signals are coherently translated back to baseband frequencies and through synchronous processing to account for Doppler frequency rotations, the frequency segments at each range of interest are separated and effectively time aligned in parallel such that the voltage maximums can be vectorially added to form a pulse compressed wave with corresponding processing gain. The resolution of a uniformly weighted waveform is shown in FIG. 2. The −11.4 dB minor lobes in the time pattern can be reduced through appropriate weighing. As N, the number of frequency segmented pulses are increased, the amplitude of the first minor lobe, without weighing, approaches −13, dB.

The time minor lobes can be reduced further by continual weighing techniques wherein the amplitude of the post detected spectral lines making up the pulse compressed spectrum are tapered from a central line to opposing ends of the total information bandwidth prior to the vector summation process.

Figure 3:
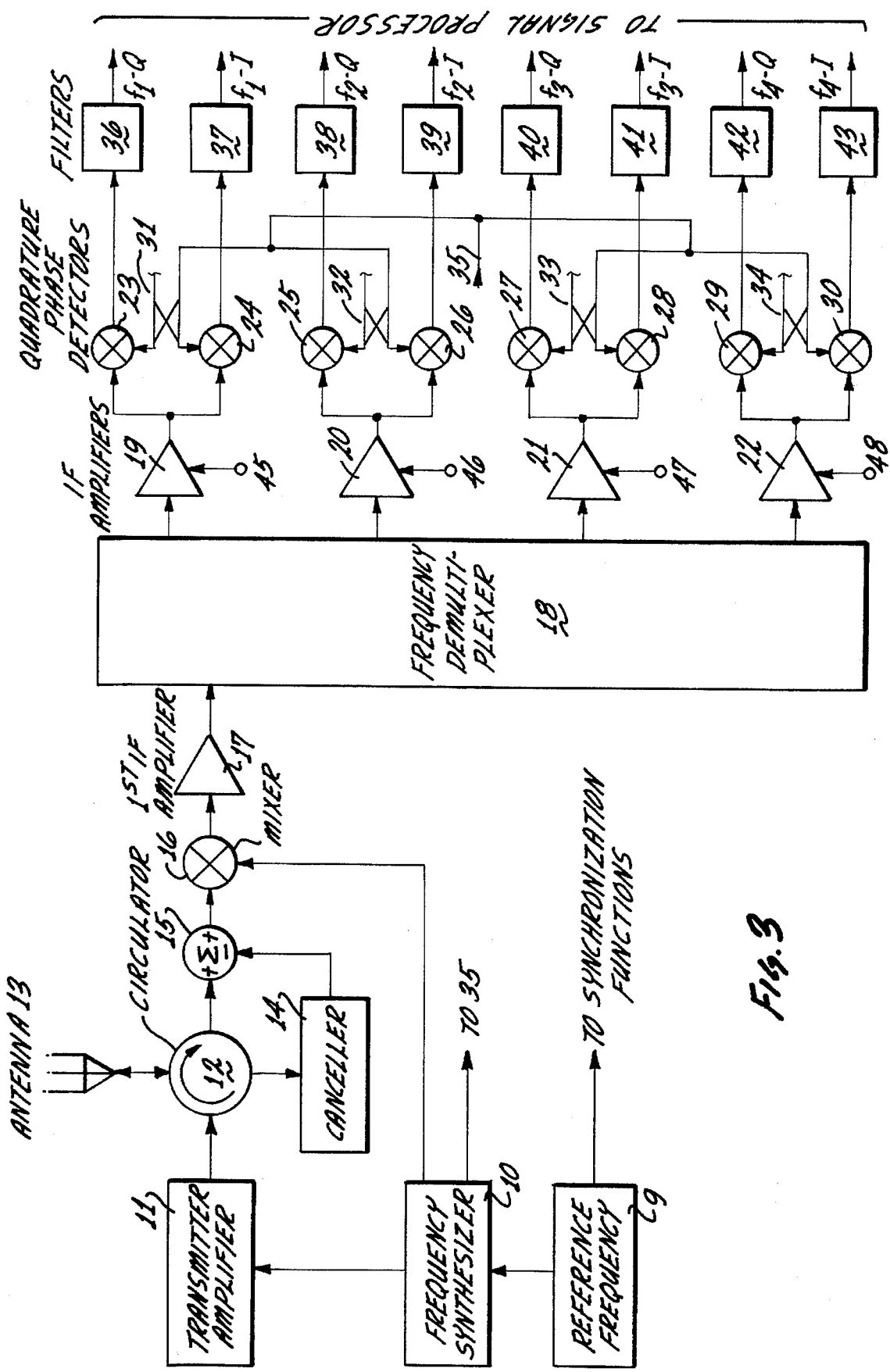
FIG. 3 illustrates a coherent frequency multiplexed radar receiver transmitter block diagram.

A simplified block diagram of the CFMR receiver transmitter is shown in FIG. 3. The transmitting portion of the radar system consists of items 9, 10 and 11, the reference or clock frequency, a frequency synthesizer and the transmitter-amplifier. Item 9 provides a stable reference frequency (ex. 100 kHz) to establish a coherent relationship for all frequencies transmitted; local oscillator signals or; baseband quadrature detection reference signals within the receiver; and the clocking source for the signal processor. The function of the frequency synthesizer, 10, is to create the various coherent frequencies required. These frequencies are then combined to form a coherent and contiguous waveform that is converted upwards to, say, a microwave band of 10.00005 to 10.00045 GHz. The low level signal from the frequency synthesizer is amplified, 11, and transmitted through circulator 12 to antenna 13 where it is radiated.

A portion of the transmitter power referred to as transmitter leakage, consisting of power reflected from the antenna mismatch and that coupled through the circulator, is directed towards the receiver. A figure of merit for a mixer is its 1 dB compression point. If subjected to an input power at the 1 dB compression level, it loses 1 dB of sensitivity. The transmitter leakage power coupled to the mixer should be less than that value. For very low power applications this may be achieved by the circulator only; however, for higher powers a canceller, 14, is required. Its purpose is to directly couple transmitter power to the summer, 15, in a negative manner so as to minimize the transmitter leakage power at the input to the mixer 16.

The received signals inputted to mixer 16 are converted to the original baseband frequencies, and amplified through I.F. amplifier 17. The frequency bands carrying $f_1$, $f_2$, $f_3$ and $f_4$ are next separated one from the other, and from the transmitting signal being transmitted, through frequency demultiplexer 18, an I.F. filter array, to separate received signals into separate frequencies. To prevent adding aliasing noise into the system, the bandwidth of the demultiplex filters and following IF amplifiers, 19, 20, 21 and 22, preceding the phase detectors are 100 kHz. The isolation required between channels is dependent upon the specific application. The required isolation is achieved by multi-section filters. Channelized outputs from the frequency multiplexer are amplified and frequency converted into quadrature signals at the original baseband frequencies, $f_1$, $f_2$, $f_3$, and $f_4$. The basic components involved consist of mixers 23 through 30, and quadrature hybrids 31 through 34, inclusive. The coherent local oscillator signal is derived within the frequency synthesizer and fed into terminal 35 of a corporate feed that provides coherent signals to the input of the quadrature hybrids. The "I" and "Q" outputs are fed into filters 36 through 43. The purpose of these filters is to choose the proper frequency components from their associated mixer circuits. For example, 1 F amplifier 19 is inputted with the frequency channel containing $f_1$, and thus filters 36 and 37 are filters that pass the $f_1$ frequency band. On the same basis, filters 38 and 39 pass $f_2$, 40 and 41, $f_3$, and 42 and 43, $f_4$. All output signals are directed to the signal processor where they are processed to provide measurements of range and velocity.

It should be noted that during the transmission of the carrier signal containing, for example $f_1$, that the transmitter leakage power is converted and transmitted through the frequency multiplex channel that receives $f_1$. Except for limited applications, $f_1$ cannot be received during its 10 μsec transmission period. Signals received at minimum range, 0–1500 meters are blanked. There are a number of places that STC and blanking controls can be introduced into the circuit. In this example they are introduced into the gain control circuits of amplifiers 19, 20, 21 and 22 through inputs 45, 46, 47 and 48, respectively. The waveform of the control signal is of the same form for all channels; but is time sequenced in accordance with the serial format of the transmitted signal.

Processing of CFMR signals for the extraction of pulse-compressed range and Doppler measurements is conveniently done through digital logic. The coherent process demands that the spectral characteristics of the original RF signals be retained and vectorially added. This is done by the translation of the RF analog signals to quadrature, digitally coded, signal voltages. A block diagram illustrating a means of sampling the signals and storing them in appropriate range bins is shown in FIG. 4. For ease in presentation, an analog technique for segregating received signals into coherent pulse compressed range bins is first described. In a practical case digital techniques will be employed. Design details as may pertain to the sequence of operation and types of components involved depend upon the requirements of a specific application and are directed toward fulfillment of processing requirements with minimal complexity and cost.

Quadrature components of received signals $f_1$, $f_2$, $f_3$ and $f_4$ are inputted into the four positions of each section of coarse range switch 49. To simplify the presentation, three section, four position switches are described. In addition, only the in-phase signal process is detailed. The quadrature phase signals are processed in an identical manner. Furthermore, for illustration only, a fourth section, section 95, has been added to the coarse range switch. This section corresponds to range of 0–1500 m and is not normally used. The operation of the coarse range switch is apparent upon examination of the following table.

| Signal Being | Baseband Signal Received* | | | | | | | |
|---|---|---|---|---|---|---|---|---|
| | SW Sec 50 | | SW Sec 65 | | SW Sec 80 | | SW Sec 95 | |
| Transmitted | Freq | Pos. | Freq | Pos. | Freq | Pos. | Freq | Pos |
| $f_2$ | $f_1$ | 52 | $f_4$ | 67 | $f_3$ | 82 | $f_2$ | 97 |
| $f_3$ | $f_2$ | 53 | $f_1$ | 68 | $f_4$ | 83 | $f_3$ | 98 |
| $f_4$ | $f_3$ | 54 | $f_2$ | 69 | $f_1$ | 84 | $f_4$ | 99 |
| $f_1$ | $f_4$ | 51 | $f_3$ | 66 | $f_2$ | 81 | $f_1$ | 96 |
| Time After Transmission That The Signal is Received* | 10–20 µs | | 20–30 µs | | 30–40 µs | | 0–10 µs | |
| Coarse Range Measured | 1500–3000 m | | 3000–4500 m | | 4500–6000 m | | 0–1500 m | |

*Switch operation is delayed by the filter delay and other fixed circuit delays

In phase baseband signals $f_1$, $f_2$, $f_3$ and $f_4$ route to positions on each section of the coarse channel switch 49. Section 50 monitors the signals returned during the period following their transmission. This corresponds to return from targets in the 1500 to 3000 meter range; i.e., signal transit periods of 10 to 20 µs. During the transmission of the pulse frequency segment referred to as $f_2$, $f_1$ is monitored at section 50 through position 52. During the next pulse period, when the pulse frequency segment referred to as $f_3$ is transmitted, section 50 monitors $f_2$ through position 53. $f_3$ and $f_4$ are similarly monitored during the next two pulse periods through positions 54 and 51 of section 50.

Simultaneously and in a sequential manner, section 65 of coarse range switch 49, is monitoring via positions 67, 68 and 69 and 66, signal returned during the second period following their transmission corresponding to targets in the 3000 to 4500 meter range; i.e., transit periods of 20 to 30 µs. Section 80 is similarly monitoring signals from target at ranges of 4500 to 6000 meters. For illustration purposes section 95 has been added. It monitors the following group of pulses in the fourth period after transmission. In that a four period range code has been chosen for this example, it is monitoring received signals referenced to the same baseband frequencies as then being transmitted.

The switching cycle for coarse range switch 49 is 40 microseconds corresponding to the total code period. It dwells at each contact for slightly less than 10 microseconds, i.e., the frequency segment pulse period. The coarse range segmented output, from rotors of sections 50, 65 and 80, are next routed to analog to digital converters 55, 70 and 85, respectively.

The range resolution of this system corresponds to a 2.5 microsecond period of 375 meters. The received signals are sampled a minimum of twice (once each in the I and Q channels) during each 2.5 µs period. Signals from each frequency segment sampled at 10 µs intervals are stored separately within the corresponding range bins. The input circuit of each analog to digital converter normally requires a sample and hold circuit; however, in many applications, tracking A/D converters may be utilized. Samples are taken at 2.5 µs intervals, e.g., 11.25, 13.75, 16.25, . . . 38.75 µs after their start of transmission. The analog signals, so sampled, are converted to their digital equivalents, for this case say 7 bits plus sign, and inputted into the rotors of Fine Range Switch 100. The analog equivalent of the switch required is again a three section, four position switch. In this case, only three sections are illustrated. Requirements for the quadrature phase signals are identical. Each section of the fine range switch completes its four position cycle in the 10 µs period of a frequency segment. As shown, section 56 is monitoring position 57. It dwells on this position for somewhat less than 2.5 microseconds during which time the "I" component of signal $f_1$ is sampled by the A/D converter 11.25 µs (plus any fixed circuit delays) after its initial transmission, and stored as a digital word in range bin 62. Ten µs later $f_2$ is similarly sampled at position 57 and stored as a second digital word in range bin 62. Progressively, at 10 µs periods, $f_3$ and $f_4$ are monitored from position 57 and stored as digital words in range bin 62. The four stored digital words within the range bin are operated on by the computer as described later to provide a pulse compressed measurement of range at 1688 meters.

The other positions of section 56, i.e., 58, 59 and 60, provide identical functions at later 2.5 µs intervals to store all consecutively received signals from targets at ranges of 2063, 2400 and 2775 meters, respectively. Sections 71 and 86 through their respective positions (72, 73, 74 and 75, and 87, 88, 89 and 90) provide similar functions at 375 meter range intervals from 3188 meters to 5812 meters. This process is completed in 40 µs. Switches 50 and 100 are implemented with FET or some other solid state switching matrix. This switching process is repeated W times for the total integration period and continues for the total operational period of the radar.

Simultaneously, all consecutive quadrature phase signals are similarly stored in a parallel group of range bins. For example, the quadrature phase signals stored in range bin 101 complement the in-phase signal accumulated in range bin 93. In the following text, the "I" and "Q" signals so stored will be considered as a single entity and referred to by the "I" range bin number; i.e., range bin 93.

The individual signal samples corresponding "I" and "Q" signals, taken a pair at a time, comprise a complex pair of orthogonal components of phasers which carry the amplitude and phase information of the received signals at the time the samples were taken. It is next necessary to process these signals in a coherent manner and derive pulse compressed range and radial velocity measurements.

The details of the signal processing to be described subsequently are shown to demonstrate that their exists at least one method for extracting the desired information. To those skilled in the art of radar and signal processing, as is taught for example in August M. Rihaczek's Principles of High Resolution Radar, copyright 1969 by McGraw Hill Book Company, it may be obvious that since the wave form already defined does not exhibit gaps in either the time domain or in the frequency domain, and is fully coherent, then if the wave form is processed in a matched filter, which by definition achieves fully coherent processing, for the wave form to which it is matched, the following properties can be achieved:

1. The range resolution becomes $c/2BW$ where BW is the total bandwidth of the coherently processed wave form which for this wave form is N.

2. The Doppler frequency resolution becomes one over the coherent integration time which in this case is WT where T is the length per word and W is the number of words integrated coherently.

3. The full height range ambiguities occur at T if the word is repeated at intervals of T. These ambiguities may be eliminated if the sequence is changed from word to word.

4. And finally that, in theory, the unambiguous Doppler frequency coverage can become virtually that of a single frequency CW wave form because of the CW and fully coherent nature of the transmission. In practice, the sampling rate, in this case $1/\tau$, establishes the range of unambiguous Doppler coverage capability.

If this is understood, then the particular implementation of a signal processor to be described in the following paragraphs can properly be viewed as one of many ways of implementing a matched filter for the coherent frequency multiplexed radar wave form previously described.

In fact, the signal processing only has to implement part of the matched filter function because the filters within the receiver provide a match to the individual frequency segments. This signal processing must therefore provide a means for coherently integrating all the various segments received in the integration period WT. It must provide this coherent integration for targets at any range and for any Doppler frequency shift within the design limits of the system, which in turn are usually less than the previously quantified maximum unambiguous range and Doppler capabilities of the system.

The Fast Fourier Transform (FFT) is the basic means to be described for providing the desired coherent integration. The various algorithms and hardware implementations of the FFT are well known. An important point is that if an FFT is performed on K complex samples uniformly spaced by $\tau$, then the total unambiguous frequency coverage is $1/\tau$ segregated into K separate bins of $1/K\tau$. Another important point is that the vector rotation and summation process it performs is fully coherent. The FFT, however, assumes that all of its samples are of the same waves, for example a single Doppler frequency. It is shown in a subsequent mathematical analysis that because of the fact that all the frequency segments transmitted are coherent and multiples of $1/\tau$, that the samples spaced by $1/\tau$ manifest only the Doppler frequency if and only if the sample times and the two way transit times to the target match within a tolerance determined by the range resolution of the system, i.e., if and only if the target is within the range bin being processed. If not, the samples become scattered and the FFT output is significantly reduced, i.e., unmatched. The FFT is capable of providing the required matching for all Dopplers of interest but only for the range bin being processed and thus is matched in both range and Doppler. The processing to be described may be repeated sequentially or performed in parallel for all range bins of interest.

Since there are WN separate samples to be processed per range bin, this can be performed in a single FFT of length WN. This is described as an alternate processing means. First a process is described wherein the FFT is performed in two sections, one with FFT's of length W and one with FFT's of length N, and it is shown that the two processes are equivalent in spite of the very different implementations. In both processes, only the samples from a single range bin are analyzed.

In the first process illustrated, these samples are first grouped by segment frequency. W samples of the same frequency segment occur at intervals of T. The W samples of the same frequency are analyzed by a W point FFT. This is done separately for each of the N different frequencies transmitted. Thus, the total frequency coverage is $1/T$ and the frequency resolution is $1/WT$.

This is referred to as a fine Doppler bin. It is shown that the matched output occurs in the same (or common) bin for each of the N FFT's in this bank of FFT's. A second FFT of N points is then performed across the N FFT's on the already partially integrated data in the corresponding output bins. The samples are ordered in the same order as they were transmitted. Since there are W output bins in the first bank of FFT's, this process is repeated W times.

Each time this N point FFT is performed it produces a matched filter output for the range bin being processed and N Doppler bins with a total Doppler coverage of $1/\tau$ and a Doppler resolution of $1/N\tau$. This is referred to as a coarse Doppler bin.

The output of this second FFT will not, however, be at its maximum unless the selected common fine Doppler bin outputs of the first FFT's are also at their maximum values. This fact can be used to produce an output within the unambiguous coverage of the coarse FFT of $1/\tau$ and the resolution of the fine FFT or $1/WT$. This is accomplished simply by finding the maximum output in all of the N bins of the coarse FFT while cycling through the W bins of the fine FFT and recording which of the common fine Doppler bins was selected for input to the coarse FFT at the time the maximum output occurred. This output will be at the maximum possible value (i.e. fully coherent gain) only if the target return is matched in range as well as in coarse and fine Doppler. Thus, fully correlated range and Doppler information is extracted from the same wave form by the matched filter. The processing and some additional background will now be described in greater detail.

For fixed targets all NW phasors corresponding to a given range bin, for example, bin 93, can simply be vectorially summed to provide a coherent processing gain of NW; i.e. the number of frequency segments, N, times W, the number of words coherently integrated. The pulse compressed range resolution is $c\tau/2N$. This would constitute matched filtering for fixed targets in range bin 93, but would not provide matched filtering for moving targets.

Moving targets introduce a Doppler frequency shift in the received signals. This causes the phasor corresponding to each subsequent frequency segment received to be rotated relative to that of a fixed target return. This phase rotation is dependent upon the target's radial velocity relative to the radar and the time elapsed since the first signal received during the integration period being processed. This progressive phase shift can be systematically eliminated through progressive counter phase rotations of each sample phasor corresponding to the Doppler frequency assumed prior to the vector summation. If the target is in the range bin being processed and if the actual target Doppler and the assumed Doppler are the same, the phasors will be colinear and the resultant phasor or vector will be NW times as large in magnitude as the individual samples. This results in a coherent processing gain of NW. This can be best accomplished with digital technology and implementation and, in particular, it will be shown that an FFT provides the desired counter-rotations for a number of Doppler bins.

Consider as an example the complex signals stored in range bin 93. They consist of NW complex signal returns from targets at a range 5063 meters, corresponding to a transit time of 3.75 μs. The "I" and "Q", 7 bit+sign, are available in serial form for N frequencies for W receptions. For this example with W=4, there are 2×N×W or 32 eight bit digital words accumulated and stored during the WT or 160 μs integration period.

Figure 5B:
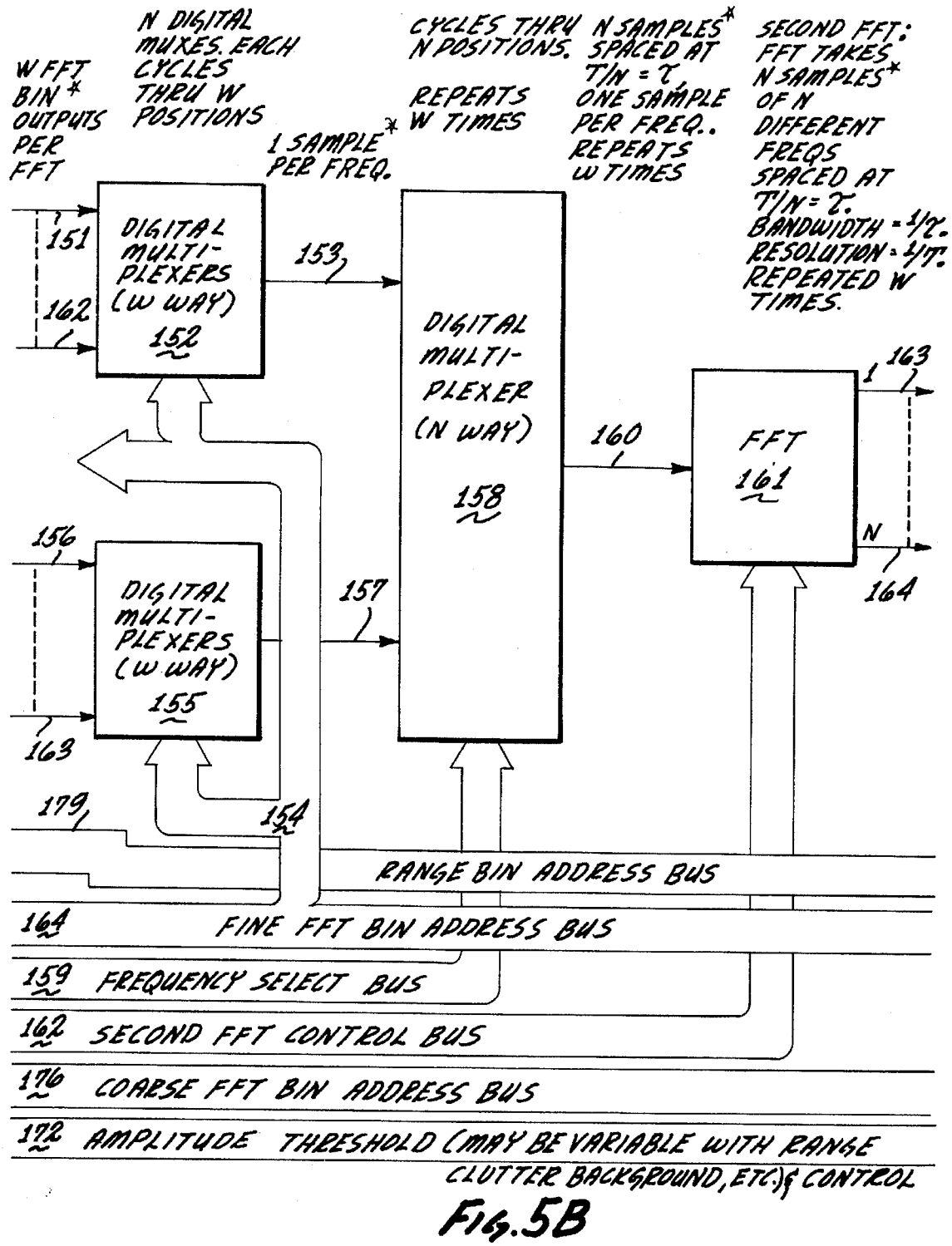

All NW samples for range bin 93 are sequentially routed to computer 102, FIGS. 5A, 5B, and 5C, hereinafter referred to as FIG. 5. Computer 102 may implement any one of a number of algorithms to coherently process the samples and extract the range and Doppler information available in the return signal.

Computer 102 may be a general purpose computer or a special purpose computer optimized for the application. In the latter case, it may be implemented to perform a number of the required Fast Fourier Transform (FFT) algorithms in parallel dependent upon speed requirements. In the limit, the processing of FIG. 5 may be replicated for each range bin of interest.

In the case of the linear sweep chosen for this example, the processing could be greatly simplified. However, non-linear frequency sequences exhibit numerous advantages over linear ones, so the processing described will be kept general enough to apply to the non-linear sequences since no limitation to linear sequences is intended.

The signals stored in range bin 93 are sequentially routed in the same order they were received, through bus 140 to Digital Demultiplexer 141, under the control of Timing and Control 142. The latter is synchronized by the clock and sync bus 182 from the reference frequency source of FIG. 3. For example, for N=4 TI Demultiplexer SN 74LS155 could be used (refer to page 7–175 of reference 1—"The TTL Data Book for Design Engineers", 2nd Edition, Texas Instruments, Incorporated). Bus 143 carries the A and B select signals changing at period $\tau$. Inputs 1 and 2 also occur at period $\tau$. The 1c and 2c lines are the "I" and "Q" samples respectively. The output lines feed busses 147–148. The control function is to route W signal returns from like frequency segments to their designated FFT (Fast Fourier Transform). For the case of the linear sequency $f_1$ is received 4 times and routed at 40 µs intervals via bus 147 to $f_1$ FFT 146.

An FFT can be thought of as first taking the phasors represented by the sampled complex input data and, on a bin by bin basis, counter-rotating each subsequent phasor by a phase angle which is proportional to the frequency of the bin times the time elapsed from the first sample and then vectorially summing the resulting phasors. The complex sum is referred to as the output of the bin. Each output bin corresponds to a Doppler frequency band or Doppler bin. The total Doppler frequency range covered by the FFT is the reciprocal of the sampling period T: or, for this case, 25 KHz, since T=40 microseconds. The FFT processes a number of bins which is equal to the number of samples taken, W. The Doppler resolution is thus 6.25 KHz for W=4. The taking of an FFT is a fully coherent process and the improvement in signal to noise ratio is W. Also, it will become important later to note that if a single frequency lying exactly at the center of one of the FFT bins is analyzed by an FFT the output in that bin is at the angle of the first phasor, because all the W–1 subsequent phasors are counter rotated to exactly that same angle.

The results of the $f_1$ FFT are stored within $f_1$ FFT 146 double buffered memory. The same signal processing applies for each of N frequency segments $f_2$ through $f_n$. These tasks may be performed concurrently or sequentially depending on the implementation of Computer 102. In this implementation, the frequency word samples $f_2$, $f_3$, and $f_4$ are processed in parallel. For example, the $f_4$ samples are routed via bus 148 to $f_n$ FFT 149. The FFTs are clocked at $\tau$ intervals via bus 150 from Timing and Control 142. For real time operation, these FFTs must be completed within the time period WT (160 µs) and then be ready to process the whole new set of samples from the next integration period which are stored in the FFT's double buffered memory while the current integration period is being processed. The characteristics of the outputs stored in FFT 146–149 are now examined. The signals inputted to Computer 102 were mixed down to baseband frequencies $f_1$ through $f_n$. The corresponding received signals are:

$$f_r = f_n + f_d \qquad (1)$$

where $f_r$=frequency of received signals $f_n$=baseband frequencies $f_d$=Doppler frequency but $$f_n = K\Delta f \qquad (2)$$

where:

K=an integer from 1 to N $\Delta f$=frequency step and $$\Delta f = 1/\tau \qquad (3)$$

where:

$\tau$=duration of a frequency segment

The samples are taken at period of $$T = N\tau \qquad (4)$$

The phase rotation between samples, $\phi_r$, to $f_n$ alone is:

$$\phi_r = 2\pi f_n N\tau \qquad (5)$$

but fron 2) and 3)

$$f_n = K/\tau \qquad (6)$$

and 5) become $$\phi_r = \frac{2\pi K}{\tau} N\tau = 2\pi KN \qquad (7)$$

K and N are both integers and the phase change between samples is an integer number of $2\pi$ rotations which is indistinguishable from no rotation at all. Thus, each FFT sorts input signals ($f_n + f_d$) into its respective output bins as if the sample to sample changes were due to $f_d$ alone, i.e., all FFT's have their maximum signal outputs in the same numerical output storage bin.

Since the outputs of all the FFTs at the differing $f_n$'s are enhanced in the same bin, corresponding to $f_d$, it is possible to add the outputs of the FFTs in the corresponding bins incoherently. The information obtained is similar to that obtained from a group of pulse Doppler radars operating at a PRF of T.

Range resolution, $\Delta R$, and Doppler resolution $\Delta f_d$:

$$\Delta R = \frac{C\tau}{2} = \frac{C}{2\Delta f} = \frac{3 \times 10^8}{2 \times 10^5} = 1500 \text{ M}$$

$$\Delta f_d = \frac{1}{NT} = \frac{1}{NWT} = \frac{1}{4 \times 4 \times 10^{-5}} = 6250 \text{ Hz}$$

Ambiguities: $R_{amb}$ and $f_{d\ amb}$ $$R_{amb} = \frac{CN\tau}{2} = \frac{CT}{2} = \frac{3 \times 10^8 \times 40 \times 10^{-6}}{2} = 6000\ M$$

$$f_{d\ amb} = \frac{1}{N\tau} = \frac{1}{T} = \frac{1}{4 \times 10^{-5}} = 25000\ Hz$$

Processing Gain, ($G_p$)

$$G_p = N\sqrt{W} = 4\sqrt{4} = 8$$

Neither the full bandwidth nor high sampling rate available from the CFMR implemented system has been utilized. The continuing objectives of the CFMR process are:
1. To utilize the total transmitted energy in a coherent manner to achieve fully coherent gain.
2. To obtain range resolution corresponding to the full bandwidth transmitted.
3. To eliminate Doppler ambiguities associated with the $1/\tau$ sampling rate.

As described earlier, the phase of the output of the FFT bin, which is at a frequency corresponding to $f_D$, is equal to the phase of the first input sample to the FFT (phase scattering due to noise is neglected for this discussion, but the presence of noise does not alter the processing to be described which is linear and fully coherent). The phase relationships between these first phasors from each of these N coherent frequencies are critical to the subsequent processing.

The phase of a received signal return from a given target relative to that of a stable L.O. at $f_c$ is a function of the frequency ($f_c+f_n$) of the transmitted segment and the round trip transit time $td_n$. The transmitted signals and the L.O. are all coherent to one another. This can be achieved, and is in this example, by having all frequency segments sent in phase at time zero; i.e., at their instant of initial transmission. (In a general case, it is sufficient to have all phases known.) The L.O. signal, $V_{LO}$, can be expressed as a function of time, t, as:

$$V_{LO} = v_{LO} \cos(2\pi f_c t + \phi_o) \qquad 8)$$

where $v_{LO}$ is the maximum amplitude of the voltage vector $\phi_O$ is an arbitrary phase angle The transmitted signal, $V_T$, can be similarly expressed as:

$$V_T = v_T \cos[2\pi(f_c+f_n)(t-(n-1)\tau)+\phi_o] \qquad 9)$$

Since ($f_c+f_n$) is transmitted (n−1) integer units of $\tau$ after the transmission of ($f_c+f_l$) and $f_n$ is a multiple of $1/\tau$, refer to equation 6), and $f_c$ is equally constrained, then the term (n−1)$\tau$ represents the time required for an integer number of phase revolutions of $2\pi$ and can thus be dropped from further consideration in matters of determining phase differences.

Since phase changes associated with phase reversal upon reflection and miscellaneous fixed delays can be accounted for and eliminated from the subsequent analyses, the return signal $V_{Rx}$ can be written:

$$V_{Rx} = V_{Rx} \cos[2\pi(f_c+f_n)(t-t_{dn})+\phi_o] \qquad 10)$$

At the sample time, $ts_n$, i.e., $t=ts_n$, the phase difference between the return signal 10) and the L.O. 8) is:

$$\phi_n = 2\pi[(f_c+f_n)(ts_n-td_n)-f_c ts_n] \qquad 11)$$

Simplifying:

$$\phi_n = 2\pi[f_n(ts_n-td_n)-f_c td_n] \qquad 12)$$

The first term is a function of the baseband frequency, $f_n$ and the range sampling error ($ts_n-td_n$). The last term is the number of carrier wave lengths to the target and back. Equation 12) can be rearranged:

$$\phi_n = 2\pi[f_n ts_n - td_n(f_c+f_n)] \qquad 13)$$

The change in phase, $\Delta\phi$, between frequencies ($f_c+f_{(n+1)}$) and ($f_c+f_n$) is found by substracting $\phi_n$ from $\phi_{(n+1)}$.

$$\Delta\phi = 2\pi[f_{(n+1)}ts_{(n+1)}-td_{n+1})(f_c+f_{(n+1)})-f_n ts_n+td_n(f_c+f_n)] \qquad 14)$$

The change in td is zero for fixed targets, but for moving targets, the range to the target and therefore the transit time to the target has changed and:

$$td_{n+1} = td_n + \Delta td \qquad 15)$$

Where $\Delta td$ is the sample to sample transit time difference introduced by a target with constant radial velocity. The transmissions are spaced by $\tau$, therefore $$ts_{n+1} = ts_n + \tau \qquad 16)$$

But $f_{(n+1)}$ is an integer multiple of $1/\tau$. The first phase related term of equation 14) ($f_{(n+1)}ts_{(n+1)}$) thus becomes $$f_{(n+1)}ts_n + \tau = f_{(n+1)}ts_n + f_{n+1}\tau = f_{n+1}ts_n + K \qquad 17)$$

where K is an integer. K can be dropped from phase calculations since it produces an integer multiple of $2\pi$. With the understanding that all values of $t_s$ are spaced by $\tau$, the subscript n can now be dropped from $ts_n$. This feature and equation 15) modifies equation 14) to:

$$\Delta\phi = 2\pi[f_{n+1}ts-(td_n+\Delta td)(f_c+f_{(n+1)})-f_n ts+td_n(f_c+f_n)] \qquad 18)$$

expanding, re-arranging, and cancelling:

$$\Delta\phi = 2\pi[(f_{(n+1)}-f_n)(ts-td_n)-\Delta td(f_c-f_{n+1})] \qquad 19)$$

The differential phase shifts involved in the FFT process can all be referenced to the return from the baseband frequency $f_1$. Then $td_1$ is the two way transit time for the initial $f_c+f_1$ transmission. For the constant radial velocity case:

$$td_n = td_1 + (n-1)\Delta td \qquad 20)$$

substituting 20) into 19), cancelling and rearranging:

$$\phi = 2\pi[(f_{(n+1)}-f_n)(ts-td_1)-\Delta td(f_c+n(f_{(n+1)}-f_n)+f_n)] \qquad 21)$$

Providing:

$$f_c \gg n(f_{(n+1)}-f_n)+f_n \qquad 22)$$

then the right hand term of 21) reduces to $$-\Delta td f_c \qquad 23)$$

and $$\Delta\phi = 2\pi[(f_{(n+1)}-f_n)(ts-td_1)-\Delta td f_c] \qquad 24)$$

$\Delta\phi$ is a linear combination of two terms. The first term is the frequency difference between adjacent baseband frequency segments, $\Delta f$, times the difference between the target transit time $td_1$ and the nearest sample time ts. If $ts=td_1$, this term vanishes. When $td_1 \neq ts$, this term scatters values of $\Delta\phi$ by an amount which depends upon the sequence of transmissions. For linear steps, cross coupling exists between range and velocity phase shifts. Systems of greatest interest have non-linear sequences and the readings are scattered when $td_1 \neq ts$. Thus when the target is centered in the range bin of interest, only the second term is significant. The second term is the segment to segment phase shift due to the target's radial motion between samples (i.e., Doppler frequency shift).

Thus, in conclusion, if the target is outside the range bin being analyzed, the phase shifts are scattered whereas if the target is centered in the range bin being analyzed, then even though the segments are at different (but coherent) frequencies, the segment to segment phase shifts are due only to the single Doppler frequency, just as if the transmission were at a single CW frequency. Recalling that the phase of the output of the FFT bin corresponding to the true target Doppler is equal to the phase of the first input sample, this is of extreme importance, since the resulting constant segment to segment phase shifts are readily extracted by a second FFT.

To achieve the CFMR objectives outlined previously, a second FFT is performed in a sequential manner across common Doppler frequency output bins of the N FFT's 146 through 149. It is permissable to use the outputs of these FFT's because, as described previously, the phases of the FFT Doppler bin outputs into which the target falls are the same as that of the first sample of each $f_n$. The results are:

1. The signal to noise ratio is further enhanced by the factor N;
2. The full bandwidth of the transmission is utilized in fully coherent processing and thus the range resolution is increased to $c/2N$, i.e. pulse compressed range information becomes available; and
3. The unambiguous Doppler capability is increased from $1/T=1/N\tau$ to $1/\tau$.

When the output of one set of common fine Doppler frequency bins has been completely processed and appropriately stored, a second set is processed. This process is continued until all W common Doppler frequency bins have been processed sequentially on a bin by bin basis.

The first fine Doppler frequency bin of the $f_1$ FFT appearing on complex output of the bus 151 is routed by Digital Multiplexer 152 to its output bus 153, then on through Digital Multiplexer 158 to FFT 161. Digital Multiplexer 152 is the digital equivalent of a "W" way analog switch that for this example is implemented for W=4. TI Multiplexer, part number SN 74LS 153 (page 165, reference 1), may be used for W=4. The devices can be cascaded for larger values of W. It is controlled by bus 154. Its function is to step through inputs 151 through 162, sequentially outputting them to bus 153. The other FFT's in this group are similarly output to their respective busses; for example, $f_n$ FFT 149 outputs 156–63 are sequentially output through bus 157. The outputs are inputted to Digital Multiplexer 158. This multiplexer is the digital equivalent of a "N" way analog switch that, for this example, is implemented for N=4 (again, TI part number SN 74LS153 can be used). It is controlled by frequency select bus 158. Its function is to sequentially cycle through the N outputs from the common Doppler frequency bin outputs of $f_1$ FFT 146 through $f_n$ FFT 149 and input them sequentially into FFT 161 in the order of transmission. Note that Digital Multiplexer 158 steps through all N of its positions before Digital Multiplexers 152 through 155 step to the next common Doppler bin. FFT 161 thus receives N inputs from a given Doppler frequency bin, performs an N point FFT and stores the results in N course Doppler frequency bins 188 through 189. This is repeated for each of the W separate common Doppler bins. FFT 161 is operated by control bus 187. All timing sequences generated by timing and control unit 142 are synchronized via clock and sync bus 182 from frequency reference 9 of FIG. 3.

If the sequence of transmission is sufficiently non linear, and $td_1 \neq ts$ the second FFT will produce a minimal output. If the outputs of the first FFT are present in bin 1 of the first group of FFTs and $td_1=ts$, the second FFT will produce an output in its bin corresponding to the target Doppler. If the outputs of the first FFT are present in bin 1 but $td_1 \neq ts$ and the transmission sequence is sufficiently non linear, the second FFT will again produce only a minimal output. If the target is within bin 93, there will always be a sample point ts within $\pm \tau/2N$ of $td_1$, in which case, the sampling error term introduces a maximum loss of 3.9 dE in the vector summation performed by the second FFT. This corresponds to a range resolution of $c\tau/2N$. It may be noted that the 3.9 dB maximum loss can be reduced to less than 1 dB by doubling the sample rate. In our example, i.e., for N=4, the maximum loss is 3.7 dB and doubling the sample rate can reduce them to 0.86 dB.

Bin 1 of the first group of FFTs when taken on the data in range bin 93 thus comprises a filter matched to the range bin and Doppler frequency of FFT bin 1. There are W bins in the first group of FFTs. The process may then be performed for bin 2 of the first group of FFTs, etc. All of the W output bins of the first group of FFTs are examined so that finally samples corresponding to bin W on bus 162 of the $f_1$ FFT through bin W on bus 163 of the $f_N$ FFT appear sequentially on bus 160 for analysis by the FFT 161. Note that FFT 161 under the control of timing unit 142 must perform W separate N point complex FFT's in the time period WT. Thus, the average time available to complete each FFT is T, which in this example is 40 µs. This is well within the present state of the art. The samples on bus 160 are analyzed in order of transmission, so that a constant radial velocity target produces a constant segment to segment phase change, i.e., a constant Doppler frequency, in the input data to FFT 161. This combination of FFTs implements the equivalent of a bank of matched Doppler filters which is matched to the target only if the target is in the range bin being analyzed, in this case range bin 93.

The total processing gain is NW; that is the signal-to-noise ratio at the output of the second FFT 161 is improved by a factor of WN when compared to range bin 93's input to Computer 102. Additionally, the total bandwidth of the transmitted signal has now been coherently utilized resulting in a pulse compressed range resolution of $c\tau/2N$. At the output of FFT 161, the unambiguous Doppler coverage is $1/\tau$ as desired, however, the Doppler resolution is $1/T$, not the desired $1/WT$. It remains to show how the outputs of the fine and coarse FFT's are correlated so that the full Doppler resolution available in the waveform can be utilized.

To summarize, the first group of FFTs have a sampling rate of T and a processing period of TW; thus, overall bandwidth=$1/T$ or, in this example, $1/T$, ex. 25 KHz i.e., Doppler frequency ambiguities @$1/T$ Doppler frequency resolution =$1/WT$, ex. 6.25 KHz The second FFT has a sampling period of $\tau$ and a processing period of N$\tau$; thus, overall bandwidth=$1/\tau$ or, in this example, 100 KHz i.e., Doppler frequency ambiguities @$1/\tau$ Doppler frequency resolution=$1/N\tau$ or $1/T$, ex.25 KHz.

The first group of FFT's (146 to 149) provides the fine Doppler resolution but the readings are ambiguous at the inverse of their lower sampling rate 1/τ. The second FFT extended the ambiguities to the inverse of their higher sample rate (1/τ); but provides a reduced resolution. The objective now is to pair these readings such that the fine Doppler readings are unambiguous out to the sampling rate of the processor. This is accomplished in the following manner.

The basic approach utilizes the fact that the W fine or common Doppler bin outputs of the N fine FFT's must be sequentially stepped through, as previously described, so that for each step the N signals are provided as inputs to the second or coarse FFT. At each of these steps the N outputs of the second or coarse FFT are scanned at a rate such that all N outputs are examined before the next fine input step occurs. In this manner, a total of NW coarse FFT output combinations, each corresponding to a fine Doppler bin, are sequentially examined. Then to find the correct Doppler bin for, for example, the single largest target in the range bin, it is sufficient to merely simultaneously record (via latch 168 in the following description) both the bin number of the fine or common Doppler bin being input to the coarse FFT at the time of occurrence of the largest output for all the NW combinations examined and the bin number of the coarse FFT in which that maximum output occurred. The complex FFT outputs are converted to magnitudes and compared within Magnitude Comparator 167. One input to the Comparator is the coarse FFT output then being examined while the other input is the largest level signal found up to that point (or just a threshold at the beginning of a sweep). When a larger signal is found, Comparator 167 strobes the latch 168 which stores the coarse and fine Doppler bin numbers as well as other pertinent information. This new signal, stored in complex form by latch 168, then becomes the B (reference) input to Comparator 167. Thus, after all NW combinations are examined, i.e., at the end of a sweep. Latch 168 contains the coarse and fine Doppler bin information and other correlated data for the single largest target in the range bin. Then Arithmetic Unit 175 manipulates the coarse and fine Doppler bin information stored in latch 168 to produce the composite Doppler bin information.

For simplification, consider instrumentation for positive Doppler frequencies only. Then the true Doppler frequency, $f_d$, can be found from the reading, $f_{d1}$, obtained from the first group of FFT's and the corresponding Doppler bin number, J, from the second FFT as follows:

$$f_d = f_{d1} + J \cdot K/\tau$$

where $f_d$ = true Doppler frequency $f_{d1}$ = Doppler frequency reading obtained from 1st group of FFT K=1 or 2, as will be described J=an integer from 1 through N In this case J is just the bin number of the second FFT. The ambiguities in the first FFT's Doppler readings are separated by 1 and the bins of the second FFT are 1 apart so that the second FFT's reading permits the true Doppler value to be selected from the N possible ambiguities.

This simplified approach is utilized in FIG. 5, although no loss of generality is intended. A serial process is depicted although parallel ones could be implemented if speed requirements so dictated. The outputs of FFT 161 appearing on busses 188 through 189 are scanned by Digital Multiplexer 165 to sequentially select one of the N input busses and route it to its output bus 166 where it is provided as input A to Comparator 167. Each FFT process performed by the $f_2$ FFT is completed in T μsec and there are N output bins. The serial process to be described must be completed, under the control of Timing and Control Unit 142 via bus 176 in T/N=τ=10 μs. Digital Multiplexer 165 is implemented in the same manner as N way Digital Multiplexer 158. Bus 166 also carries the data to Latch 168 where it can be stored along with other correlated information derived simultaneously from the same input data as may be commanded by Comparator 167. Digital Multiplexer 165 has two additional sections controlled by bus 176, wired so that the inputs correspond to one bin above and one bin below the bin of interest. Where one of these bins is outside the range of 1 to N, the input is hard wired to a zero amplitude. These additional outputs of Digital Multiplexer 165, called upper and lower bin are also routed to Latch 168 on busses 186 and 183, respectively. This information is required to facilitate association of the coarse and fine velocity bin information within Arithmetic Unit 175. The latched value, corresponding to the input on 166 at the time Latch 168 was strobed, appears on bus 169 and is provided as the "B" input to Comparator 167. Comparator 167 converts the "I" and "Q" components of both the "A" and "B" inputs to magnitudes $M_A$ & $M_B$, respectively, where $$M_A = [I_A^2 + Q_A^2]^{1/2}$$

and $$M_B = [I_B^2 + Q_B^2]^{1/2}$$

This may be accomplished using a table lookup or any of the other well known approximations. Comparator 167 compares $M_A$ with $M_B$. (This can be implemented by using TI 4 bit magnitude comparators P/N SN 74LS85 (page 7–57 of Reference 1) cascaded as shown on page 7–64 of Reference 1.) If the magnitude of "A" is greater than the magnitude of "B" at the time the strobe signal (at τ periods of) from Timing and Control Unit 142 via line 170 appears, an output is provided on line 171 to cause Latch 168 to latch its inputs. (Latch 168 can be implemented using a bank of TI octal "D" type edge triggered, tri-state, flip flops, PN SN 74LS364, page 7–467 of Reference 1). A method for automatically finding the single largest target in the range bin is described to demonstrate that all the information in the output is correlated.

At the start of processing for each new range bin, the outputs on bus 169 are set to the value provided from Timing and Control Unit 142 via bus 172 thereby establishing a desired prescheduled level for the magnitude threshold. Simultaneously, the "target present flag" on line 173 is reset to "0" by a reset signal from bus 172. This is accomplished by having two of the tri-state latches with outputs tied together in standard bus fashion to bus 169. One of the latches is fed by threshold bus 172 and that latch's outputs is only enabled when the "target present flag" is a logic "0". Any time Latch 168 is strobed by line 171, logic "1" on line 174 is latched and forces the "target present flag" line 173 to logic "1". This also enables the other latches' outputs to bus 169 and the outputs from the latch containing the initial threshold are disabled. Only if the incoming signal exceeds threshold will the "target present flag" go to a logic "1" to indicate the presence of valid data on the remaining outputs of Latch 168 and Arithmetic Unit 175. The first time this occurs the value of the signal from bus 166 which exceeded the preset threshold value becomes the input to Comparator 167. Unless a signal appears that exceeds the new and higher threshold, this remains for the period the given range bin is processed. When a signal larger in magnitude than the new threshold is examined, it in turn becomes the new threshold. In this way comparator 167 locates and defines the largest signal in the range bin, which is then simultaneously latched into bus 169.

Consider that instant of time the last A>B strobe occurs on line 171. This occurs when the largest signal is in the range bin. At that instant, Digital Multiplexer 165 under control of Timing and Control Unit 142 via bus 176 has selected that one of N bins of FFT 161 having largest output. Bus 176 is input to latch 168 and is latched to become the coarse Doppler bin number on bus 177. Simultaneously, the N Digital Multiplexers 152 through 155 were controlled by bus 154 to select one of the W fine Doppler bins. It follows that the fine Doppler bin selected is the one that caused FFT 161 to produce its largest output. The bus 154 information is therefore latched by Latch 168 to become the fine Doppler data on bus 178. Timing and Control Unit 142 also provides Latch 168 with the Range Bin Address via Bus 179. The latched output is the range bin information provided to Bus 180.

Note that the outputs of the first group of FFTs, 146 through 149 were never looked at directly since the signal-to-noise ratio is improved only by a factor of W at this point. Instead, the output of FFT 161, where the signal-to-signal noise ratio is improved by a factor of NW, is monitored. This yields the best possible statistical decision as to fine Doppler value since the signal to noise ratio is maximum at this point. Since one and only one fine Doppler bin is selected at a time by Multiplexers 152 through 155, the fine resolution ($1/w\tau$) is obtained.

The latched Coarse and Fine Doppler information on Busses 177 and 178, respectively, are processed within Arithmetic Unit 175 to yield the final Doppler output on Bus 181. With the simplifying assumption that only positive Doppler velocities are instrumented, the Arithmetic Unit 175 merely adds J-k units of $1/\tau$ to the fine Doppler reading. J is the coarse Doppler bin, out of a possible N values, input on Bus 177. k is either 1 or 2 depending on the ratio of the amplitudes of the signals in the adjacent upper (U) and lower (L) coarse velocity bins appearing on busses 184 and 185, respectively. Arithmetic Unit 175 performs magnitude comparisons on complex ("I" & "Q") data. If U>L, then k=1. If U<L, then k=2. If U=L, then k=1 if the $f_{d1}$ reading corresponds a bin number≤W/2 out of the first group of FFTs and 2 otherwise. These comparisons can be implemented using the means similar to those described for magnitude Comparator 167. A digital adder can be implemented using a bank of TI P/N SN 74LS283 4 bit binary full adders (page 7–415 of Reference 1) with one input being the Fine Doppler information from Bus 178 and the other input being the output of a ROM look up table with at least N entries. The ROM is addressed by the J input from bus 177 and the calculated k value. Each ROM output is the pre-calculated product of (J-k) and $1/\tau$.

All the output information on Busses 169, 173, along with the range word, 180 and the Doppler words 181 is derived at the same instant of time from the same data and all applies only to the largest magnitude target in the range bin and is therefore totally correlated.

A single FFT of length NW operating with the same NW samples, would yield identical outputs. This is mentioned to illustrate the fact that the details of the processing scheme do not affect the outputs of the process as long as a matched filter is implemented for every range velocity combination of interest. This also leads to the conclusion that the transmit sequence could be permutted during the period of integration without altering the output in the bin containing the target; but of course the ambiguity function would be affected. In fact, as a matter of design choice, the sequence could be varied from word to word randomly or pseudorandomly, or in any other desired manner to obtain some desired characteristic of the ambiguity function. In practice, filters 36 through 43 of FIG. 3 would typically not be ideal matched filters, but would have a response which would be a matter of design choice relating to isolation requirements, the effects on the system ambiguity function, etc. The processing scheme illustrated was chosen for several reasons.

(1) It was judged to be a better vehicle than the single FFT approach for teaching insight into the process of implementing a matched filter for this class of waveforms.

(2) It has the property that the number of multiplications or multiplies required to perform the FFT (and hence usually the corresponding processing time) can be reduced. The number of multiplications required to perform a FFT of length N is often given in the literature as N $\log_2$ N. A single FFT of length NW would require NW $\log_2$ NW or ($\log_2$ W+$\log_2$ N) multiplications. The scheme illustrated required N (W $\log_2$ W)+W (N $\log_2$ N) or NW ($\log_2$W+$\log_2$N) multiplications which is as might be expected the same as themethod using the single FFT.

However, the scheme illustrated is capable of significant (hardware/processing time) reductions when multiple adjacent range bins are to be implemented. For example, if the N range bins with a segment $\tau$ were instrumented, then instead of repeating the first groups of N FFTs, N times, it would suffice to perform the first group of N FFTs once as illustrated then perform N separate rotations of the outputs of the existing first group of FFTs. Since each FFT in the first group is dedicated by frequency, and the phase shift and the time delay are related if the frequency is known, each of the N phase rotations of the data on bus 153, for example, could be made to correspond to a different sampling point. Typically, these would be spaced by $\tau$/N or the time width of a range bin. Of course, there would have to be corresponding rotations on the corresponding other N-1 busses through 157.

An approximation to the reduction in the number of multiplies required through using this technique can be obtained by recognizing that a phase rotation of a complex number requires two multiplies per component or four total per rotation. Since there are a total NW samples to be rotated by N different phase shifts, this operation requires $4N^2$ W multiplies. The second FFT must be performed NW times and the $N^2$ W $\log_2$ N+4 $N^2$ W multiplies are required altogether, i.e, the total number of multiplies required is $N^2$ W ($\log_2$ N+4). If N separate FFTs of length W were performed, the number of multiplies required would be N (NW $\log_2$ NW) which is $N^2$ W ($\log_2$ N+$\log_2$ W). The savings accrue when $\log_2$ W>4 or W>16. The savings available is $N^2$ W($\log_2$ W−4) multiplies which may be very significant for large W. One skilled in the art might be led to recognize that commonalities in the input data can be taken advantage of to effect even more significant reductions in the processing time/hardware required.

Range ambiguities occur if the range word is periodically repeated. In CFMR this type of periodocity can be avoided by transmitting the frequency segments making up each range word in a non repetitive manner and continuing to do so in all successive transmissions. To be effective N>32. This provides a thumbtack ambiguity function. Under such conditions, the CFMR processing objectives enumerated on page 13 have been met;

Resolution ($\Delta R$ and $\Delta f_d$)

$$\Delta R = \frac{C\tau}{2N} = \frac{C}{2N\Delta f} = \frac{3 \times 10^8}{2 \times 4 \times 10^5} = 375 \text{ M}$$

$$\Delta f_d = \frac{1}{W\tau} = \frac{1}{NT} = \frac{1}{4 \times 4 \times 10^{-5}} = 6250 \text{ Hz}$$

Ambiguities ($R_{amb}$ and $f_{d\ amb}$)

$$R_{amb} = \frac{CWT}{2} = \frac{3 \times 10^8 \times 4 \times 40 \times 10^{-6}}{2} = 24000 \text{ M}$$

$$f_{d\ amb} = \frac{1}{\tau} = \frac{1}{10 \times 10^{-6}} = 100,000 \text{ Hz}$$

Processing Gain ($G_p$)

$(G_p) = NW = 4 \times 4 = 16$

Figure 6:
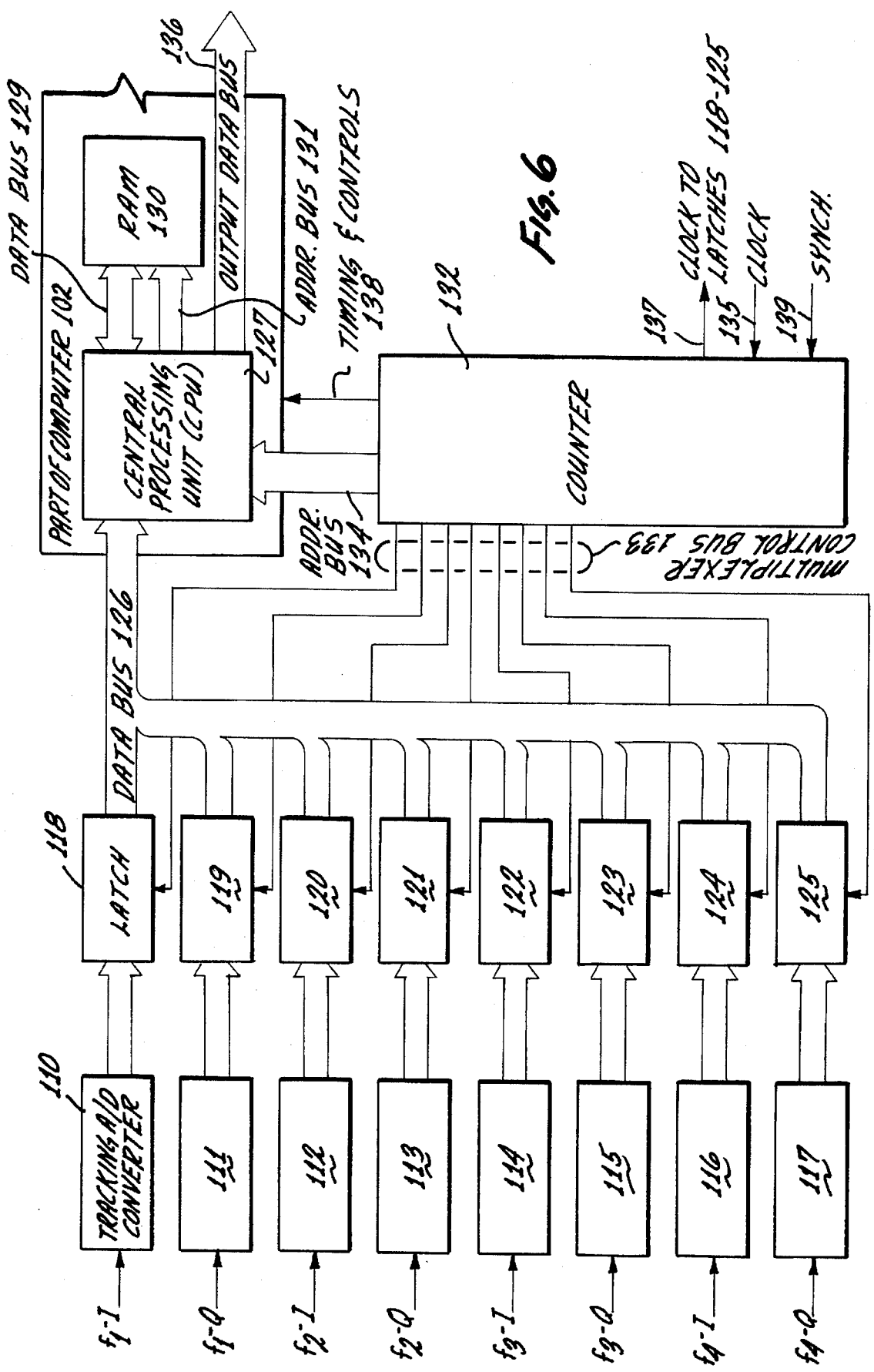
FIG. 6 illustrates signal commutation into range bins, digital version.

FIG. 4 provides an analog technique for sorting signals into range bins. A digital implementation integrated within Computer 102 is preferred. FIG. 5 and the accompanying description made primary reference to a single range bin, 93. FIG. 6 depicts a simplified digital implementation of the range processor of FIG. 4. The process is readily extended for operation with any higher value of N. Here the bulk of the commutation is performed within the internal addressing decoding logic of a RAM (Random Access Memory). Tracking A/D converters 110 through 117 provide continuous digital representations (ex.: 7 bits+sign) of their analog inputs consisting of "I" and "Q" components of the received signals $f_1$ through $f_4$. The parallel digital outputs of the tracking A/D converters are strobed into their dedicated latches, 118 through 125 simultaneously at $\tau/N$. For this example:

$$\frac{\tau}{N} = \frac{10 \text{ }\mu SEC}{4} = 2.5 \text{ }\mu SEC$$

Appropriate synchronization of clock functions are derived from sync Bus 182. (This $\tau/N$ period corresponds to the times when the A/D converters of FIG. 4 were strobed. The dedicated latch outputs are sequentially multiplexed onto data bus 126 at $\tau/2N^2 = 0.3125$ μsec per latch under the control of multiplexer control bus, 133. As a result, the "I" sample word followed by the complementary "Q" sample word for each of N frequencies appears serially on bus 126 and is fed into CPU (central processing units) 127. CPU 127 reads the contents of data bus 126 each 0.3125 μsec. and via RAM address bus 131 addresses locations within RAM 130 each $\tau/4N^2 = 0.15625$ μsec. The same data is written into two range bins. The most significant portions of the overall address correspond to "I" and "Q" samples of the same frequency segment for the same range bin and therefore repeat every T=40 μsec period. Since the address changes every $\tau/4N^2$, the basic address pattern is $$\frac{N\tau}{\tau/4N^2} = 4N^3 = 256$$

steps in length. It is generated within the synchronous counter 132 synchronized to bus 182. Counter 132 can be part of the Timing and Control Unit 142 of FIG. 5. A number of address sequences can be utilized to assure that the signals are properly routed. For example, the address is broken into 4 portions corresponding to the preceding descriptions of the commutations of FIG. 4, plus an accumulator flag portion described in a subsequent paragraph.

"T"–"Q" portion of address:
1 bit at $\tau/N^2 = 0.3125$ μsec per state
Fine Range portion of address:
2 bits binary upcount at $\tau/N = 2.5$ μsec per state
Coarse Range portion of address:
2 bits binary downcount at rate $\tau/N^2 = 0.625$ μsec per state with 1 downcount inhibited at end of period.

Note: FIG. 4 and 6 both represent all range devices, thus samples taken simultaneously of consecutively transmitted segments correspond to targets exactly one coarse range ($\tau$ μsec) apart. At every fine range sample time (at interval of $\tau/N$) there are exactly N samples taken simultaneously corresponding to the N coarse ranges. In FIG. 4, the bank of coarse range switches need only change position once each $\tau$ due to the parallelism of the implementation. In FIG. 6, the N different coarse samples taken simultaneously every $\tau/N$ must be multiplexed sequentially onto the same line and thus the coarse range portion of the address changes every $\tau/N^2$ seconds. The coarse range address change is inhibited once every $\tau$. This corresponds to the change in position of the bank of coarse range switches in FIG. 4. Thus, the samples are always tagged with the correct coarse range bin number.

The remaining section of the address allows the samples to be stored separately:

these less significant portions of the address determine the storage location within the range bin and change every $\tau/N$ μsec and consist of two subportions.

$\log_2 W$ bits (where the number of words integrated, W, is a power of 2), indicating the word number within the bin. This is 2 bits for W=4

$\log_2 N$ bits (where the number, N, of unique frequency segments transmitted is a power of 2), indicating the transmission location within the word. This is 2 bits for N=4 as in our example.

At the beginning of the range word all counts are synchronized from bus 182. The portions of RAM address bus 131 of interest are derived from the counter address bus 134. All latch (118 to 125) sequences are clocked from bus 137 to mutually exclusively enable each of the latches 118 through 125 for a 0.3125 μsec period. Counter 132 provides a synchronized 8 line output on multiplexer control bus 133. Each of the 8 outputs is routed to one of the tri-state latches 118 through 125. Counter 132 also provides timing and control signals, 138, to CPU 127 to synchronize the entire range processor.

CPU 127, via bus 129, stores the contents of data bus 126 at the selected address, i.e., a location within the appropriate range bin. Thus, the samples of the various returned "I" and "Q" frequency segments $f_1$ through $f_4$ are stored separately in the proper sequence within the correct range bins of RAM 130. Since the data on bus 126 changes half as frequently as the RAM address on bus 131, the new data is added to the contents of two separate range bins, corresponding to whether the accumulator flag bit portion of RAM address bus 134 is a logic 1 or 0. This optional feature, provided for scanning systems, starts a second accumulation at the midpoint in time of the first accumulation. When an accumulation is completed, the contents of the range bin are output for further analysis and a new accumulation is begun. CPU 127 reads the data in RAM 130 on a range bin by range bin basis. The data appears on Data Bus 129 and is routed to output bus 140 for input to the processing associated with FIG. 5. Alternately, bus 140 can feed a multiplexer so that the data from separate range bins are routed separately to a number of processors, each as depicted in FIG. 5, for parallel processing.

A single A/D converter operating at 0.3125 μsec per conversion installed on bus 126 obviates the need for separate tracking A/D converters 110 through 117. These can be replaced by sample and hold circuits. Also, latches 118 through 125 can be replaced by analog multiplexers.

It should also be evident that the sampling times used in the processing described above can be advanced or delayed in accordance with the range determination made by Computer 102 to cause range bins defined by the samples to track the location of a target. Each target to be tracked requires a movable (or selectable) pair of sample points, repeated at the period τ. Two range bins per tracked target are adequate. The movable and fixed samples can be taken on a non-interfering basis to provide a track-while-scan capability. A simple implementation for tracking a large number of targets is to have fixed array of such samples with outputs of the appropriate pairs routed to their respective range bins. In a general case, the samples used for the all range processor can be used for the tracking, adding only those range bins required for tracking a given number of targets.

Referring back to FIG. 5, it should be noted that the circuit can be implemented with STC (Sensitivity Time Control) or Doppler discrimination such as responding to moving target only. The variable threshold on Bus 172 can be adjusted to instrument STC in the receiver; primarily, to maximize dynamic range, and also Doppler discrimination if it were varied as a function of the Doppler bin being processed at that time. To accomplish this, Timing and Control Unit 142 would, via Bus 172, causes Latch 168 to be initialized to an appropriate threshold level just prior to the time that each new velocity bin is processed. For maximum desensitization of certain Doppler bins, it is feasible to simply bypass processing these bins entirely. Multiplies targets in the same range bin, but having different velocities, are all reported individually. This follows from the fact that all the transmission, reception and processing functions described are linear and that therefore superposition applies. Accordingly, if multiple targets existed within the same range bin, but had sufficiently different velocities, they appear in separate velocity bins. Each time a target exceeds its combined range/velocity bin threshold, all correlated information is caught by latch 168 and eventually appear on Busses 169, 173, 180 and 181. The "Target Present Flag" on bus 173 can initiate storage of these potentially larger number of outputs in secondary memories to allow further processing.

In general, the correlated range, velocity and signal level information can be output from Computer 102 as is or stored for further processing within Computer 102 depending on the intended application. For example, it is possible to derive an interpolated range reading by examining the outputs of adjacent range bins. If adjacent bin signals were of equal amplitude and at the same velocity, this would imply that the true target is located halfway between the range bin values. Similarly, if in a single range bin, outputs of equal amplitude were found in adjacent velocity bins, this implies that the true velocity is halfway between the velocity bin values. In general, the amplitude ratio of signal in adjacent range bins at a given velocity determines the interpolated range value. Similarly, the amplitude ratio of signals in adjacent velocity bins at a given range determines the interpolated velocity value.

Further processing can also be used to improve the detectability of small targets in the presence of larger ones through recognition that once the largest target is found, its predicted trails in other range/velocity bins can be evaluated.

In certain applications, for example, missile guidance, it is desirable to track the target into zero range. Under such conditions the signal-to-noise ratio available is orders of magnitude greater than required for detection, but the frequency segment then being transmitted becomes self jamming. If the reflected transmitted power is reduced to a level that does not introduce excessive non-linearities into the receiver circuits, then Doppler filtering is adequate to separate received signals from the transmitted signal and reception continues into zero range. For medium to high power applications, power management is utilized wherein the transmitted power is reduced as the range to target is decreased. The magnitude of the transmitted power is established as required to maintain a predetermined signal-to-noise ratio within the receiver process.

The available processing resources, as depicted by FIG. 4, can be used for range zooming wherein the range resolution is improved for targets within a portion of the total range being observed. To improve the range resolution by a factor of 12, the signal format can be changed as follows:

$$N = 12 \quad \Delta R = 31 \text{ m}$$
$$\Sigma BW = 4.8 \text{ MHz} \quad BW_n = 400 \text{ KHz}$$
$$T = 30 \text{ μs} \quad \tau = 2.5 \text{ μs}$$

The pulse frequency segments are a continuing multiple of the highest baseband frequency previously used; i.e., 400, 800, ... 4800 KHz. These baseband frequencies are translated to the carrier band of interest. On reception the signals are mixed down to I.F. demultiplexer level where the larger bandwidths require new multiplexing circuits. Through judiciary choice of local oscillator frequency and circuit time sharing, the resources of the remaining circuitry can be advantageously utilized. A 2.5 μs period centered at the specific range of interest is to be divided into twelve parts. To achieve this, the switching rates in both the coarse and fine range circuits are increased twelvefold. Each range bin now correlates signals in 31 meter range increments. The total resources of the signal process are now focused in specific areas of interest at the expense of temporary discontinuance of the surveillance mode of operation.

In standard CFMR operation, the overall bandwidth is N Δf, where N is the number of unique frequency segments to be transmitted and Δf is the separation between any one of the transmitted frequencies and the next highest or lowest transmitted frequency.

In some applications, it may be necessary or desirable to spread the spectrum of the transmission. For example, the probability of an external receiver, that does not have the means to perform a coherent signal process on the CFMR signal receptions, detecting the CFMR signals is reduced when the bandwidth of the CFMR transmission is spread. The spectrum is spread by introducing a number, M, of guard channel frequency offsets in the transmissions. The frequency offsets are generally large compared to NΔf but are not necessarily uniform.

These offsets are introduced on a time multiplexed basis such that a continuous transmission results. Refer to FIG. 3. The offsets are introduced in any desired order by Frequency Synthesizer 10. This involves heterodyning one of the M guard channel frequencies at an I.F. level. All N frequency segments making up a given range word are transmitted on a common guard channel. A following range word is sent on a different (perhaps randomly chosen) guard channel. On reception the guard channel steps are removed. The local oscillator signal generated in the frequency synthesizer 10 and routed to Mixer 16 carries the time programmed frequency offsets required to subtract out each successive guard channel frequency.

The returns are stored and processed separately on a guard channel by guard channel basis and stored. These separate output signals agree as to target range and velocity. They may be incoherently added together to achieve an improvement in signal-to-noise ratio and accrue the benefits of frequency diverse transmissions.

The larger bandwidth provided by coherent guard channel frequency spreading produces a number of very fine range lobes that are encompassed within the broader pulse compressed range lobe. Such characteristics may be advantageously used. For targets with a small depth in comparison with the basic pulse compressed resolution, an improved signal-to-noise ratio is realized at the ranges where the returns reinforce. At such ranges, range resolution is improved to correspond to a time equal to the reciprocal of the new overall transmission bandwidth. For some applications, range bins may be instrumented only for those ranges so that the signal to clutter ratio is maximum by virtue of the high resolution capability at these known ranges. Targets with a radial velocity relative to the radar can be expected to walk into one of the instrumented range bins. Complex targets of greater physical depth relative to the new range bin might have individual characteristics that satisfy small depth requirements and provide fine signal information capable of assisting in target identification.

As previously discussed, Doppler ambiguities exist at the inverse ratio of the sampling rate of $1/\tau$ utilized by FFT 161. For that example:

$$f_{d\,max} = 2V/c - f_c$$

where $f_d$ max=maximum non-ambiguous Doppler frequency= $1/10^{-5} = 0.1$ MHz
$f_c$=carrier frequency (10 GHz)
V=target velocity
C=speed of light $3 \times 10^8$ m/sec.
Solving for v $$V = \frac{Cf_{dMAX}}{2f_o} = \frac{3 \times 10^8 \times 10^5}{2 \times 10^{10}} = 1500 \text{ M/SEC.}$$

Targets with radial velocities above 1500 m/sec. can fold over, or alias with lower speed targets and are ambiguous.

CFMR is a continuous wave signal and, if required, the unambiguous Doppler capabilities may be extended by utilizing higher sampling rates than $1/\tau$. Where the unambiguous Doppler frequency bandwidth capability is increased, the Doppler frequency shift involved may exceed the receiver's minimum bandwidth and appropriate implementation is required.

In order to provide for the processing of any number of the total $N^2$ range bins available, the process described in FIG. 5 may be repeated sequentially, range bin by range bin or in parallel through the use of additional sets of FFTs operating in parallel.

The same technique may be used to process returns in a single range resolution cell (bin) or in all range bins or any intermediate number of bins and thereby implement a single target tracking processor to an all range surveillance receiver processor. Naturally, the circuitry ahead of the processor can be further simplified if only a small number of range bins are to be implemented. It is also true that if a large number of range bins are implemented, then, commonalities in the input data can be taken advantage of to reduce the total number of computations required, thereby improving the processing speed or reducing the total amount of hardware required in the processor, Computer 102.

FIG. 3 depicted analog filtering for separating baseband frequencies $f_1$, $f_2$, $f_3$ and $f_4$. Time sampling techniques can also be utilized to achieve frequency filtering. This is referred to as Time Domain Filtering. Since the transmitter signal and receiver local oscillator signals are precisely known and contained within the same radar unit, it is possible to sample received signals when the transmitter feed through signal is zero. The techniques for accomplishing this is shown in FIG. 7.

Assuming $f_1$ is the signal whose detection is desired, it can be heterodyned in mixer 200 with a local oscillator whose frequency is also $f_1$. The DC output 205 is a replica of the $f_1$ frequency segment pulse of duration $\tau$. A matched filter for this pulse is comprised of an integrator 203 in combination with a time delayed negative feedback signal 202. It provides the autocorrelation function of the pulse of length $\tau$ to which it is matched wherein the output pulse builds up from a zero value at time $(t_s-\tau)$ to a value of $\tau$ at time $t_s$ and then the negatively fed back time delay signal subtracts from the stored signal to again establish a zero value at the time $(t_s+\tau)$, curve 206. This signal, if sampled at $t_s$, is sampled at maximum voltage value.

All other signals, including the undesired transmitter leakage signal input into the first mixer along with the desired $f_1$ signal, are harmonically related to $1/\tau$; i.e., they are integer multiples of $1/\tau = f_1$ and the output is in the form of beat notes containing a integer number of cycles. The integrated output of the "I" channel (sine wave) is an offset cosine wave, curve 207, having a phase reversal at the zero crossover coincident with sample time $t_s$. The integrated output of the "Q" channel (cosine wave) is a sine wave, curve 208, having a phase reversal at zero crossover also coincident with sample time $t_s$. The important relationship is that both the "I" and "Q" channels beat notes go through zero at the sample time. The number of cycles within the sample period $\tau$ is a function of the beat frequency difference. The maximum amplitude of the beat frequency signal is inversely proportional to the number of cycles involved; thus, the slope of the curve going through the zero point is the same for all beat frequencies involved. Both the local oscillator and the transmitted signal are within the control of the system so that the zero crossover point can be effectively controlled, and all signals, except the desired one are efficiently rejected.

The position of the D-C integrated signal is dependent upon the transit time to target. The sample times are implemented a period $\tau$ apart. The response of the adjacent range cell is shown dotted in 206. If the target lies exactly halfway between the two sampling points, $t_s-\tau/2$, the signal loss is 6 dB. The average filter loss is 2.5 dB. This compares to an average filter loss for conventional radars of 1.8 dB. In the final design, this can be accepted or, through additional logic, reduced.

It is readily apparent to those skilled in the art that the details of the frequency-segmented signal format, in terms of number of pulses utilized, frequency sequence, bandwidth and other related design parameters, along with the sequence of digital operation, circuit techniques, etc., are matters of design choice chosen in accordance with specific applications involved. Changes, modifications, and improvements to the above described embodiment of this invention may be made by those skilled in the art without departing from the spirit and scope of the invention. In view of the many changes, modifications, and implementations that may be made to the above described embodiment of this invention without departing from the spirit and scope of the invention, we do not wish the patent to be limited in any manner inconsistent with the invention as defined in the appended claims.

Having described our invention, we now claim:

1. A continuous wave, frequency-multiplexed radar system, comprising:

transmitter means for transmitting, against a target, a continuous output signal having successive cycles, each of said cycles including N mutually coherent, contiguous segments, wherein said output signal has a respective predetermined frequency during each of said segments;

receiver means for receiving a return signal produced by reflection of said output signal from said target, while said output signal is being transmitted;

separation means connected to said receiver means for, during each cycle, separating said return signal into N respective frequency components corresponding to said predetermined frequencies;

means for successively obtaining quadrature samples from said separated frequency components for each of the segments of a return signal cycle, said samples being obtained in a predetermined order during each of a plurality of range times following transmission of said signal cycle in said output signal; and matched filter processing means for combining quadrature samples obtained from a succession of return signal cycles during a respective one of said range times to produce indications of the range and velocity of a target having a range corresponding to said range time.

2. The system of claim 1 wherein said segment frequencies are harmonically related.

3. The system of claim 2 wherein said N successive contiguous segments are pseudo-randomly ordered in each of said output signal cycles.

4. The system of claim 1 wherein all of the segments of a cycle are of the same time duration.

5. A method for measurement of target range and velocity by a continuous wave, frequency-multiplexed radar system including a transform processing means for combining signal samples to produce predetermined target indicia, comprising the steps of:

generating a continuous periodic output signal having successive periods, wherein each of said periods includes N contiguous, mutually coherent time segments in each of which said output signal has a respective predetermined frequency;

continuously transmitting said output signal against a remote target to generate a continuous reflection of said output signal from said target;

continuously receiving said reflected signal while said output signal is being transmitted;

separating N frequencies from said received signal;

obtaining quadrature samples from said separated frequencies for each of the periods of a received signal cycle, said samples being obtained in a predetermined order during each of a plurality of range times following transmission of said period in aid output signal;

for each of said predetermined frequencies, accumulating quadrature samples obtained from a succession of received signal cycles during a respective one of said range times; and combining all quadrature samples accumulated during said range time to produce indications of the range and velocity of a target having a range from said radar system corresponding to said range time.

6. The method of claim 5 wherein the predetermined frequencies of said cycle time segments are harmonically related.

7. The method of claim 6 wherein time segments are pseudo-randomly ordered.

8. The method of claim 5 wherein all of said time segments are of equal duration.

9. A method for measurement of target range and velocity by a continuous wave, frequency-multiplexed radar system including a transform processing means for combining signal samples to produce predetermined target indicia, comprising the steps of:

generating a continuous periodic output signal having successive periods, wherein each of said periods includes N contiguous, mutually coherent time segments in each of which said output signal has a respective predetermined frequency;

continuously transmitting said output signal against a remote target to generate a continuous reflection of said output signal from said target;

continuously receiving said reflected signal while said output signal is being transmitted;

separating N frequencies from said received signal;

obtaining quadrature samples from said separated frequencies for each of the periods of a received signal cycle, said samples being obtained in a predetermined order during each of a plurality of range times following transmission of said period in said output signal;

for each of said predetermined frequencies, accumulating quadrature samples obtained from a succession of received signal cycles during a respective one of said range times;

pulse-compressing the accumulation of quadrature samples for each of said predetermined frequencies by further sampling each said sample during each of a plurality of fine range times occurring during said time;

progressively phase-shifting accumulated, pulse-compressed quadrature samples obtained during said fine range times and combining phase-shifted quadrature samples to obtain respective Doppler frequency accumulations; and successively combining all of said respective Doppler frequency accumulations with each of said fine range accumulations to produce indications of the range and speed of a target having a range from said radar system corresponding to a respective one of said fine range times.

* * * * *